(12) United States Patent
Dudding et al.

(10) Patent No.: US 12,403,737 B2
(45) Date of Patent: Sep. 2, 2025

(54) LIFT AXLE SUSPENSION SYSTEMS WITH LIFT PADDLE

(71) Applicant: Hendrickson USA, L.L.C., Schaumburg, IL (US)

(72) Inventors: Ashley T. Dudding, Yorkville, IL (US); Sean T. Lindsay, Palos Park, IL (US); Ryan M. Ettenhofer, Oak Park, IL (US); Michael P. Robinson, Chicago, IL (US); Richard J. Aumann, Bolingbrook, IL (US)

(73) Assignee: Hendrickson USA, L.L.C., Schaumburg, IL (US)

( * ) Notice: Subject to any disclaimer, the term of this patent is extended or adjusted under 35 U.S.C. 154(b) by 0 days.

(21) Appl. No.: 18/551,357

(22) PCT Filed: Mar. 18, 2022

(86) PCT No.: PCT/US2022/020987
§ 371 (c)(1),
(2) Date: Sep. 19, 2023

(87) PCT Pub. No.: WO2022/198070
PCT Pub. Date: Sep. 22, 2022

(65) Prior Publication Data
US 2024/0174040 A1 May 30, 2024

Related U.S. Application Data

(60) Provisional application No. 63/163,539, filed on Mar. 19, 2021.

(51) Int. Cl.
*B60G 11/46* (2006.01)
(52) U.S. Cl.
CPC ........ *B60G 11/465* (2013.01); *B60G 2202/11* (2013.01); *B60G 2202/152* (2013.01); *B60G 2204/121* (2013.01); *B60G 2204/148* (2013.01)

(58) Field of Classification Search
CPC ........ B60G 2204/148; B60G 2204/121; B60G 2202/152; B60G 2202/11; B60G 11/46; B60G 11/465
See application file for complete search history.

(56) References Cited

U.S. PATENT DOCUMENTS 3,285,621 A   11/1966  Turner, Jr.
3,970,293 A *  7/1976  Sweet .................. B60G 17/052
                                                         267/31

(Continued)

FOREIGN PATENT DOCUMENTS

CN    115091907 A  *  9/2022
CN    117677509 A  *  3/2024  ............. B60G 11/27

(Continued)

OTHER PUBLICATIONS

Hendrickson USA, LLC, Technical Procedure Trailer Suspension Systems UBL Installation Procedure for Wide-Bushing Suspension Models, Jul. 2009, pp. 1-12, L719 Rev A.

(Continued)

*Primary Examiner* — Paul N Dickson
*Assistant Examiner* — Maxwell L Meshaka
(74) *Attorney, Agent, or Firm* — Cook Alex Ltd.

(57) ABSTRACT

A lift axle suspension system incorporating a lift paddle is disclosed. The lift paddle comprising a first pad, a second pad and a rigid support arm securing the first pad and the second pad in fixed relation to one another. The first pad is attached to a lift spring, the second pad is secured to the bottom surface of the main support member/leaf spring. Actuation of the lift spring causes the axle to be lifted out of contact with the ground surface.

21 Claims, 16 Drawing Sheets

(56) References Cited

U.S. PATENT DOCUMENTS

| | | | | |
|---|---|---|---|---|
| 4,529,224 | A | * | 7/1985 | Raidel ............... B60G 9/003 280/124.109 |
| 5,403,031 | A | * | 4/1995 | Gottschalk ........... B62D 61/12 280/86.753 |
| 5,655,788 | A | * | 8/1997 | Peaker ............... B60G 17/005 280/86.5 |
| 6,062,579 | A | * | 5/2000 | Fortier ............... B60G 9/02 280/124.16 |
| 6,135,470 | A | * | 10/2000 | Dudding ............ B60G 21/05 280/124.171 |
| 6,193,266 | B1 | * | 2/2001 | Cortez ............... B60G 21/055 280/678 |
| 6,416,069 | B1 | * | 7/2002 | Ramsey ............. B60G 11/27 280/124.128 |
| 6,471,223 | B1 | | 10/2002 | Richardson |
| 6,527,286 | B2 | * | 3/2003 | Keeler ............... B60G 9/00 280/124.135 |
| 6,851,689 | B2 | * | 2/2005 | Dudding ............ B60G 9/00 280/124.13 |
| 6,871,862 | B2 | * | 3/2005 | Chalin ............... B60G 7/02 280/124.157 |
| 6,883,813 | B2 | | 4/2005 | Gottschalk |
| 7,475,892 | B2 | * | 1/2009 | Dudding ............ B60G 11/28 280/124.13 |
| 7,841,607 | B2 | * | 11/2010 | Dodd ............... B60G 11/46 280/124.17 |
| 7,854,436 | B2 | * | 12/2010 | Hock ............... B60G 11/27 280/124.128 |
| 8,029,008 | B2 | * | 10/2011 | Cortez ............... B60G 11/113 280/124.175 |
| 8,177,246 | B2 | * | 5/2012 | Cortez ............... B60G 11/113 280/124.175 |
| 8,419,029 | B2 | * | 4/2013 | Muckelrath ........... B60G 9/003 280/124.128 |
| 8,434,747 | B2 | * | 5/2013 | Dudding ............ B60G 11/04 267/41 |
| 8,827,289 | B2 | * | 9/2014 | Dilworth ............ B60G 11/113 280/124.111 |
| 8,967,646 | B2 | | 3/2015 | Schwarz et al. |
| 9,004,512 | B2 | * | 4/2015 | Noble ............... B60G 11/42 280/124.116 |
| 9,050,870 | B2 | * | 6/2015 | Wilson ............... B60G 11/113 |
| 9,050,873 | B2 | * | 6/2015 | Dilworth ............ B60G 11/04 |
| 9,085,212 | B2 | * | 7/2015 | Dudding ............ B60G 9/02 |
| 9,114,685 | B2 | * | 8/2015 | Wilson ............... B60G 11/113 |
| 9,242,524 | B2 | * | 1/2016 | Dudding ............ B60G 11/27 |
| 9,415,654 | B2 | * | 8/2016 | Wilson ............... B60G 11/465 |
| 9,493,048 | B2 | * | 11/2016 | Dilworth ............ B60G 11/10 |
| 9,796,231 | B2 | * | 10/2017 | Wilson ............... F16F 1/26 |
| 9,809,073 | B2 | * | 11/2017 | Lindsay ............. B60G 17/00 |
| 10,611,206 | B2 | * | 4/2020 | Zawacki ............ B60W 30/02 |
| 11,156,259 | B2 | * | 10/2021 | Krieg ............... B60G 11/02 |
| 11,565,563 | B2 | * | 1/2023 | Dudding ............ B60G 11/465 |
| 2002/0067017 | A1 | * | 6/2002 | Keeler ............... B60G 9/00 280/124.128 |
| 2002/0117816 | A1 | * | 8/2002 | Dudding ............ B60G 9/00 280/6.151 |
| 2004/0056441 | A1 | * | 3/2004 | Chalin ............... B60G 9/00 280/86.5 |
| 2005/0146108 | A1 | * | 7/2005 | Dudding ............ B60G 9/00 280/124.11 |
| 2006/0049600 | A1 | * | 3/2006 | Dudding ............ B60G 9/00 280/124.11 |
| 2006/0244236 | A1 | * | 11/2006 | Cortez ............... B60G 11/113 280/124.175 |
| 2006/0290089 | A1 | * | 12/2006 | Dudding ............ B60G 11/465 280/124.17 |
| 2010/0038877 | A1 | * | 2/2010 | Cortez ............... B60G 11/113 280/124.175 |
| 2010/0140892 | A1 | * | 6/2010 | Dodd ............... B60G 11/46 280/124.111 |
| 2011/0221156 | A1 | * | 9/2011 | Muckelrath ........... B60G 9/003 280/124.117 |
| 2012/0032412 | A1 | * | 2/2012 | Cortez ............... B60G 11/12 280/124.175 |
| 2012/0126504 | A1 | * | 5/2012 | Piehl ............... B60G 11/27 280/124.116 |
| 2013/0307242 | A1 | * | 11/2013 | Noble ............... F16F 1/373 280/124.178 |
| 2013/0320644 | A1 | * | 12/2013 | Wilson ............... F16F 1/26 280/124.11 |
| 2014/0035248 | A1 | * | 2/2014 | Dilworth ............ B60G 11/04 280/124.17 |
| 2014/0035250 | A1 | * | 2/2014 | Dilworth ............ B60G 11/04 280/124.111 |
| 2014/0138929 | A1 | * | 5/2014 | Wilson ............... B60G 11/113 280/124.11 |
| 2014/0239607 | A1 | * | 8/2014 | Wu ............... B60G 9/003 280/124.116 |
| 2014/0265205 | A1 | * | 9/2014 | Dudding ............ B60G 9/02 280/124.116 |
| 2015/0145227 | A1 | * | 5/2015 | Wilson ............... B60G 13/005 280/124.11 |
| 2015/0165851 | A1 | * | 6/2015 | Dilworth ............ B60G 9/003 29/525.01 |
| 2015/0321529 | A1 | * | 11/2015 | Dudding ............ B60G 11/27 280/124.116 |
| 2015/0329099 | A1 | * | 11/2015 | Zawacki ............ B60W 10/18 701/37 |
| 2016/0311283 | A1 | * | 10/2016 | Wilson ............... B60G 11/113 |
| 2017/0087949 | A1 | * | 3/2017 | Lindsay ............. B60G 9/003 |
| 2018/0361811 | A1 | * | 12/2018 | Chua ............... B60G 9/003 |
| 2019/0178324 | A1 | * | 6/2019 | Krieg ............... F16F 1/368 |
| 2019/0337347 | A1 | * | 11/2019 | Dudding ............ B60G 11/465 |
| 2020/0047578 | A1 | * | 2/2020 | Wieczorek ........... F16F 1/3835 |
| 2021/0138860 | A1 | * | 5/2021 | Dudding ............ B60G 11/02 |
| 2024/0174040 | A1 | * | 5/2024 | Dudding ............ B60G 11/27 |

FOREIGN PATENT DOCUMENTS

| | | | | |
|---|---|---|---|---|
| DE | 102013113492 | A1 | * 6/2015 | ........... B60G 11/465 |
| DE | 102013113492 | B4 | 1/2019 | |
| EP | 0431673 | A1 | * 6/1991 | |
| EP | 431673 | B1 | 7/1993 | |
| EP | 0836984 | A1 | * 4/1998 | |
| EP | 0941915 | A1 | * 9/1999 | |
| EP | 0961726 | B1 | 10/2002 | |
| EP | 1332954 | A1 | * 8/2003 | ........... B60G 11/465 |
| EP | 1661739 | A1 | * 5/2006 | ........... B60G 11/465 |
| EP | 1332954 | B1 | 6/2006 | |
| EP | 1332953 | B1 | 11/2006 | |
| EP | 1661739 | B1 | 5/2011 | |
| EP | 2502809 | B1 | 9/2013 | |
| EP | 2873595 | A1 | 5/2015 | |
| EP | 2873596 | A1 | 5/2015 | |
| EP | 2915727 | A1 | 9/2015 | |
| EP | 3177468 | B1 | 3/2019 | |
| EP | 2930089 | B1 | 4/2019 | |
| EP | 3473457 | B1 | 2/2020 | |
| EP | 3489047 | B1 | 4/2020 | |
| EP | 3636464 | A1 | * 4/2020 | ........... B60G 11/465 |
| ES | 2932052 | T3 | * 1/2023 | ........... B60G 11/465 |
| GB | 2222391 | A | * 3/1990 | ........... B60G 11/465 |
| WO | WO-2013079756 | A1 | * 6/2013 | ........... B60G 11/27 |
| WO | WO-2014091041 | A1 | * 6/2014 | ........... B60G 11/465 |
| WO | 02014122355 | A | 8/2014 | |
| WO | WO-2014122355 | A1 | * 8/2014 | ........... B60G 11/28 |
| WO | WO-2017086781 | A1 | * 5/2017 | ........... B60G 17/005 |
| WO | WO-2024047100 | A1 | * 3/2024 | |

OTHER PUBLICATIONS

Hendrickson USA, LLC, UBL Under Beam Lift Lightweight Axle Mechanism, Jun. 2020, pp. 1-2, L727 Rev F.

Hendrickson USA, LLC, Parts List UBL Under Beam Lift, Jun. 2019, pp. 1-8, L757 Rev H.

Hendrickson USA, LLC, Liftable Suspension Guide Trailer Commercial Vehicle Systems, Nov. 2019, pp. 1-16, L801 Rev E.

(56) References Cited

OTHER PUBLICATIONS

Hendrickson USA, LLC, UBL Under Beam Lift Intraax, Jun. 2020, pp. 1-2, L1309.
Hendrickson USA, LLC, Technical Procedure Under Beam Lift Hardware Kit Information and Requirements, Mar. 2017, pp. 1-2, T91001 Rev B.
Hendrickson USA, LLC, Understanding Trailer Air Suspensions, Jun. 2008, pp. 1-40, L761 Rev B.

* cited by examiner

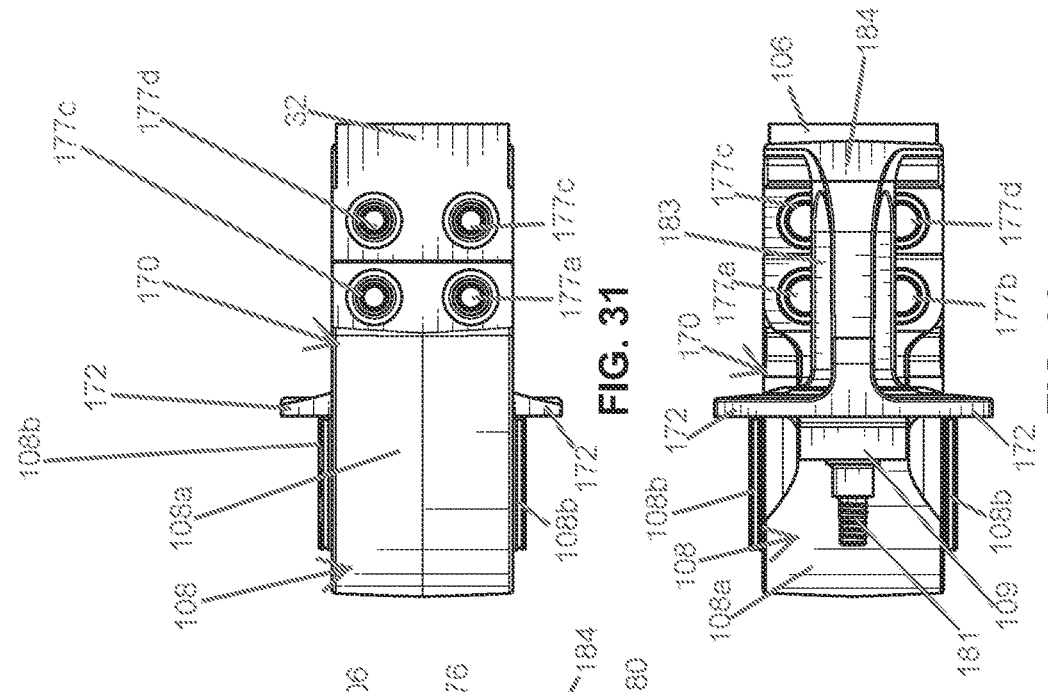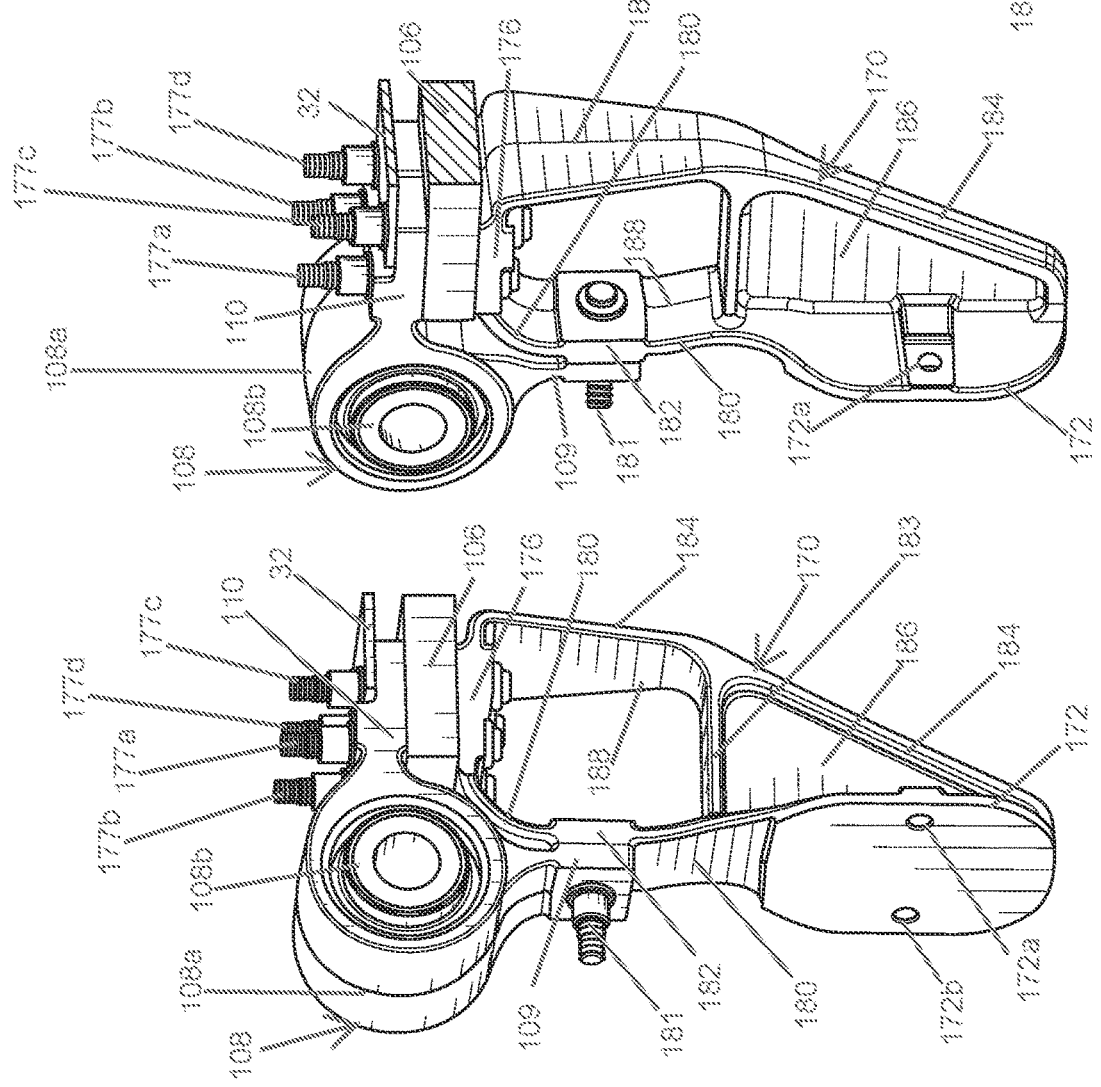

LIFT AXLE SUSPENSION SYSTEMS WITH LIFT PADDLE

CROSS-REFERENCE TO RELATED APPLICATIONS

The present application is a U.S. National Stage of PCT International Patent Application No. PCT/US2022/020987, filed Mar. 18, 2022, which claims priority to U.S. Provisional Application Ser. No. 63/163,539, filed Mar. 19, 2021, both of which are incorporated herein by reference in their entireties.

TECHNICAL FIELD

The present disclosure generally relates to auxiliary lift axle suspension systems for wheeled vehicles such as heavy duty trucks, commercial vehicles and trailers. More particularly, the present disclosure relates to auxiliary lift axle suspension systems having an improved mechanism for selectively lifting and lowering the wheel bearing auxiliary axle of a vehicle into and out of road engagement.

BACKGROUND OF THE INVENTION

The need for certain vehicles such as heavy duty trucks, commercial vehicles and semi-trailers and the like, to have at least one (and often more than one) designated wheel bearing axle suspension system(s) capable of being raised and lowered selectively into and out of load bearing engagement with the road surface, is well-known in the art. This need usually arises in order that the vehicle be capable of legally satisfying maximum highway weight limit laws, as well as to provide an additional measure of safety when the vehicle is loaded. In this respect, such maximum weight limit laws often mandate, not just a maximum vehicle weight, but further prescribe that the required number of axles needed be spaced in such a manner so as to distribute the weight of the vehicle and its cargo over a selected length of the vehicle. Such extra axles and their attached suspension systems are often referred to as auxiliary or liftable or lift axle suspension systems.

The ability to lawfully carry the maximum weight of the load (cargo) allowed by law often translates economically into maximized profit and a more economically efficient use of the vehicle.

Lift axle suspension systems, however, have the potential to add to the complexity and the frequency and nature of required maintenance relative to non-liftable axle suspension systems. Ensuring safety and reliability while reducing vehicle suspension weight, complexity and purchase and maintenance costs are challenges faced when attempting to develop commercially viable, lift axle suspension systems.

The present disclosure addresses shortcomings found in prior art suspension systems.

SUMMARY OF THE INVENTION

There are several aspects of the present subject matter which may be embodied separately or together in the devices and systems described and claimed herein. These aspects may be employed alone or in combination with other aspects of the subject matter, and the description of these aspects together is not intended to preclude the use of these aspects separately or the claiming of such aspects separately as set forth in the claims appended hereto.

In one aspect of this disclosure, a lift axle suspension assembly includes a hangar bracket, an axle and a leaf spring. The leaf spring includes a front arm and a seat. The leaf spring is configured for coupling at the location of the seat to the axle with the use of an axle coupling fastener. The front arm of the leaf spring has a top surface and a bottom surface, is of a generally solid construction, and includes an eye or is connected to an eye extension. The leaf spring is configured for pivotal mounting to the hangar bracket. The axle suspension also includes a lift bracket, a lift spring and a lift paddle arranged in an operative relationship. The first end portion of the lift bracket is secured to the hangar bracket, a second end portion of the lift bracket is connected to the first end portion of a lift spring. The paddle includes a first pad, a second pad and a first rigid support arm that connects the first pad to the second pad in fixed relation to one another. The first pad of the lift paddle attaches to the second end portion of the lift spring. The lift spring actuates and a load is transmitted from the lift spring to the lift paddle and from the lift paddle to the leaf spring causing the axle to be lifted out of contact with the ground surface.

In another aspect of this disclosure, a leaf spring and lift paddle combination is provided for a lift axle suspension. The leaf spring includes a front arm and a seat and is configured for coupling qat the location of the seat to an axle. The front arm of the leaf spring has a top surface and bottom surface, is of a generally solid construction, and includes an eye or is connected to an eye extension to permit the leaf spring and lift paddle combination to be pivotally mounted to a vehicle hangar bracket. The lift paddle includes a first pad, a second pad and a first rigid support arm connected the first pad tot eh second pad in fixed relation to one another.

BRIEF DESCRIPTION OF THE DRAWINGS

In describing the preferred examples, reference is made to the accompanying drawing figures wherein like parts have like reference numerals, and wherein:

FIG. 29 is a left side, front perspective view of the subject matter of FIG. 28;

FIG. 30 is left side, rear perspective view of the subject matter of FIG. 29;

FIG. 31 is a top elevational view of the subject matter of FIG. 29;

FIG. 32 is a bottom elevational view of the subject matter of FIG. 29;

DETAILED DESCRIPTION

The embodiments disclosed herein are for the purpose of providing a description of the present subject matter, and it is understood that the subject matter may be embodied in various other forms and combinations not shown in detail. Therefore, specific designs and features disclosed herein are not to be interpreted as limiting the subject matter as defined in the accompanying claims.

Figure 1:
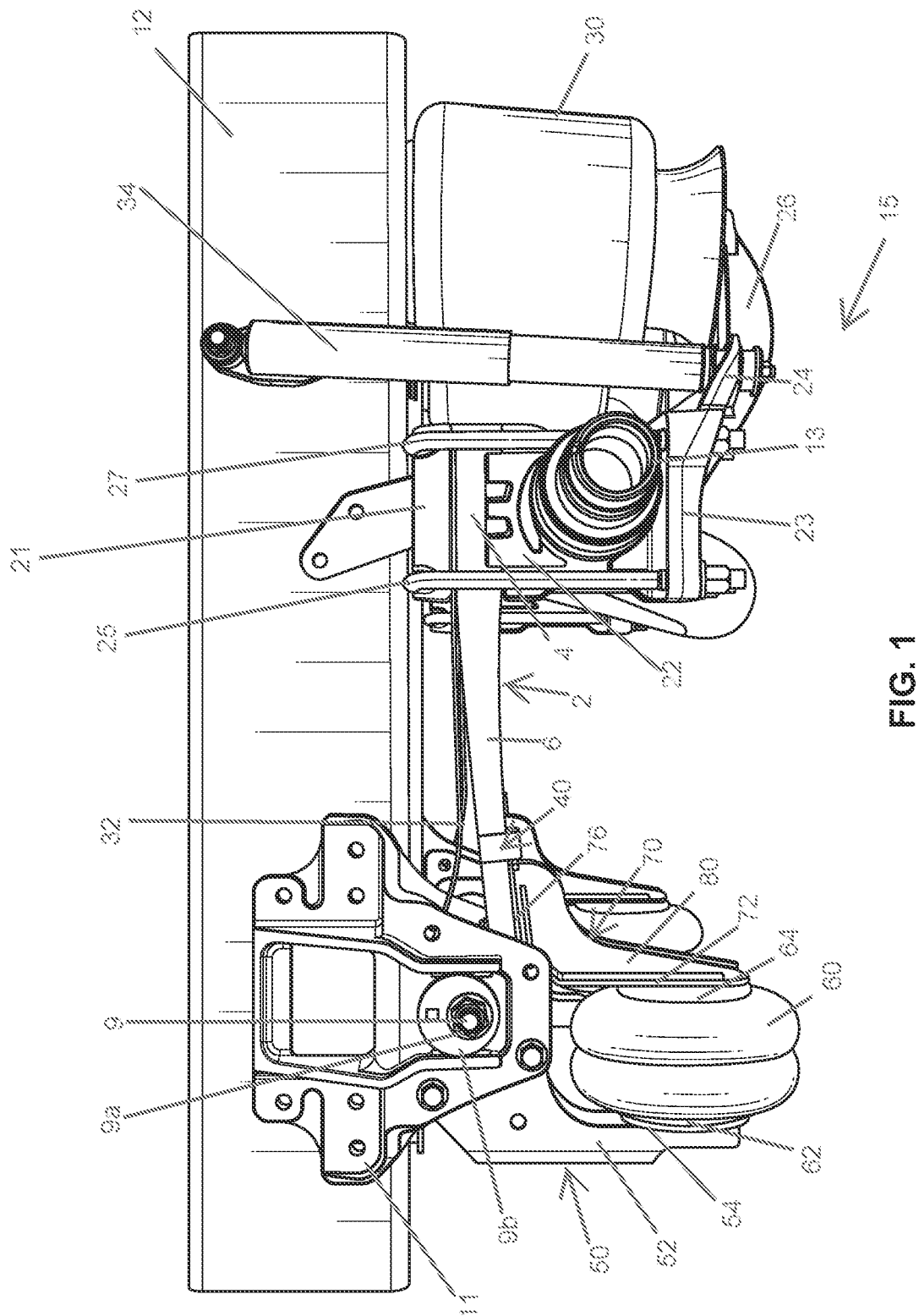
FIG. 1 is a left side, elevational view showing both sides of a lift axle suspension system mounted to the chassis of a vehicle, incorporating a leaf spring and lift paddle, according to a first embodiment of the present disclosure.

A lift axle suspension system incorporating a first example lift paddle 70 of the present disclosure is indicated in general at 15 (FIG. 1). FIG. 1 has the wheel ends and brakes removed to more clearly see the components that will be referred to or discussed herein. A longitudinally extending frame member 12 appears on each side of a vehicle chassis. A laterally extending axle 13 is disposed below the frame member 12.

The lift axle suspension system 15 incorporating a first example lift paddle 70 includes a longitudinally oriented, suspension linkage or main support member, which in this example is in the form of a leaf spring 2. It will be appreciated that the longitudinally oriented, suspension linkage may be any suitable single leaf spring, which may be a half leaf spring which includes a front arm 6 and a seat 2 as shown in FIG. 1, a beam spring, a full leaf spring, or a multi-leaf spring, and whether in a leading arm configuration, or in a trailing arm configuration as shown in FIG. 1. The leaf spring 2 in the lift axle suspension system 15 shown in FIG. 1 extends over the axle 13 in an overslung arrangement. In other suspension systems, the suspension linkage may extend over, under, through or around the axle 13, without departing from the scope of the present disclosure.

The axle 13 is connected or secured to the leaf spring 2 through the use of an axle coupling assembly, which in this example, rigidly secures the axle 13 to the leaf spring 2 at the location of the seat 4 in the manner discussed below. The leaf spring 13 has a first end that includes a cylindrical eye portion or eye 8 movably connected or pivotally connected to the frame hanger bracket 11 with materials and techniques known to those skilled in the art, which may include for example, the use of a bushing assembly 8a and a pivot bolt 9, a thread nut or connector 9a, and an end plate or end cap 9b, as appropriate. The axle 13 and the leaf spring 2 pivot about a rotational axis. During normal use, the travel path or movement of the axle 13 and the leaf spring 2 generally follows an arc defined in substantial part by the main support member's pivotal connection to the vehicle frame via hangar bracket 11.

The axle coupling assembly operatively couples the axle 13 to the leaf spring 2. From the top downward beginning with the top mounting pad, the axle coupling assembly includes a top mounting pad or first mounting pad 21, also known as a first guide plate or clamp plate; a caster wedge or intermediate pad 22 disposed between the seat 4 of the leaf spring 2 and the axle 13; and a bottom mounting paid or second mounting pad 24, also known as a second guide plate or clamp plate which includes a reward extension 26 providing platform for mounting an air spring 30 which is also mounted at its top end to the vehicle frame member 12. A pair of U-shaped fastener assemblies 25, 27, which in the first example embodiment are shown as first and second U bolts and connectors are used to clamp together the aforementioned components in fixed relation to another. A shock absorber 34 is pivotally connected at its upper end to a to a bracket mounted on the vehicle frame member 12 and attached at its bottom end to a rearward extension 24 of the bottom mounting pad 23. Although the present disclosure employs an air spring 30, it is not limited to such a configuration, and may be deployed with other suspension types, such for example, the suspension type illustrated in U.S. Pat. No. 9,050,873 which employs a straight monoleaf spring design with shock absorber 34, with and without an air spring, as well as other suspension types referred to or disclosed herein without departing from the scope of the present disclosure.

Figure 2:
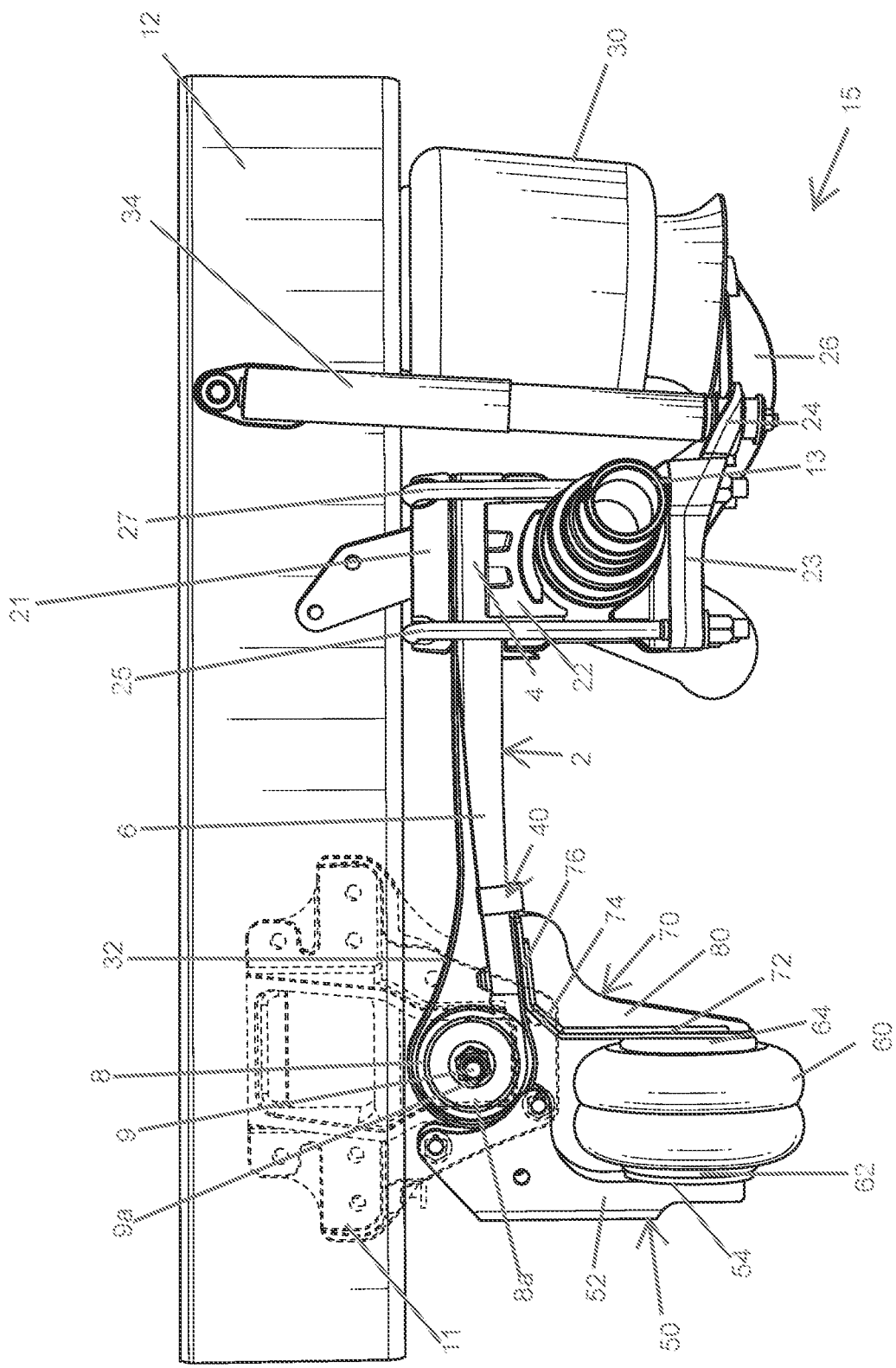
FIG. 2 is a left side, elevational view of the left side of the lift axle suspension system of FIG. 1 with select components in phantom.

A leaf spring retainer 32, is constructed as a band to wrap around and capture the leaf spring 2, in the event the spring is fractured during vehicle operation. In FIG. 2, the leaf spring retainer is secured at one end between the top pad 21 and the seat 4 of the leaf spring 2. The leaf spring retainer extends forward and around the eye 8 to be secured between the bottom surface of the front end portion of the front arm 6 of the leaf spring 2 and the top pad or the second pad 76 of the paddle 70.

A lift bracket 50 (FIGS. 4-9) to which a first end portion 62 of a lift spring 60 is secured at a first end portion or upper portion to the frame hangar bracket 11. The lift bracket 50 serves as an extension of the hangar bracket 12 and provides a generally stationary platform in relation to the lift spring 60 and lift paddle 70 for mounting the lift spring 60. In this example, the lift bracket 50 includes a body 52 having a first end portion or upper end portion configured for attachment to the hangar bracket. A second end or lower end portion presents a disk or pad 54 for mounting a first end portion 62 of the lift spring 60. A second end or the movable end 64 of the mounted lift spring 60 is received by or secured to the first example lift paddle 70 as further discussed below.

FIG. 2 shows one side of the lift axle suspension system of FIG. 1 with the hangar bracket in phantom to better show the first example lift paddle 70 secured to the front arm 6 of the leaf spring 2 rearward of and near the eye 8. A similar system would be provided on the opposite side of the vehicle.

Figure 3:
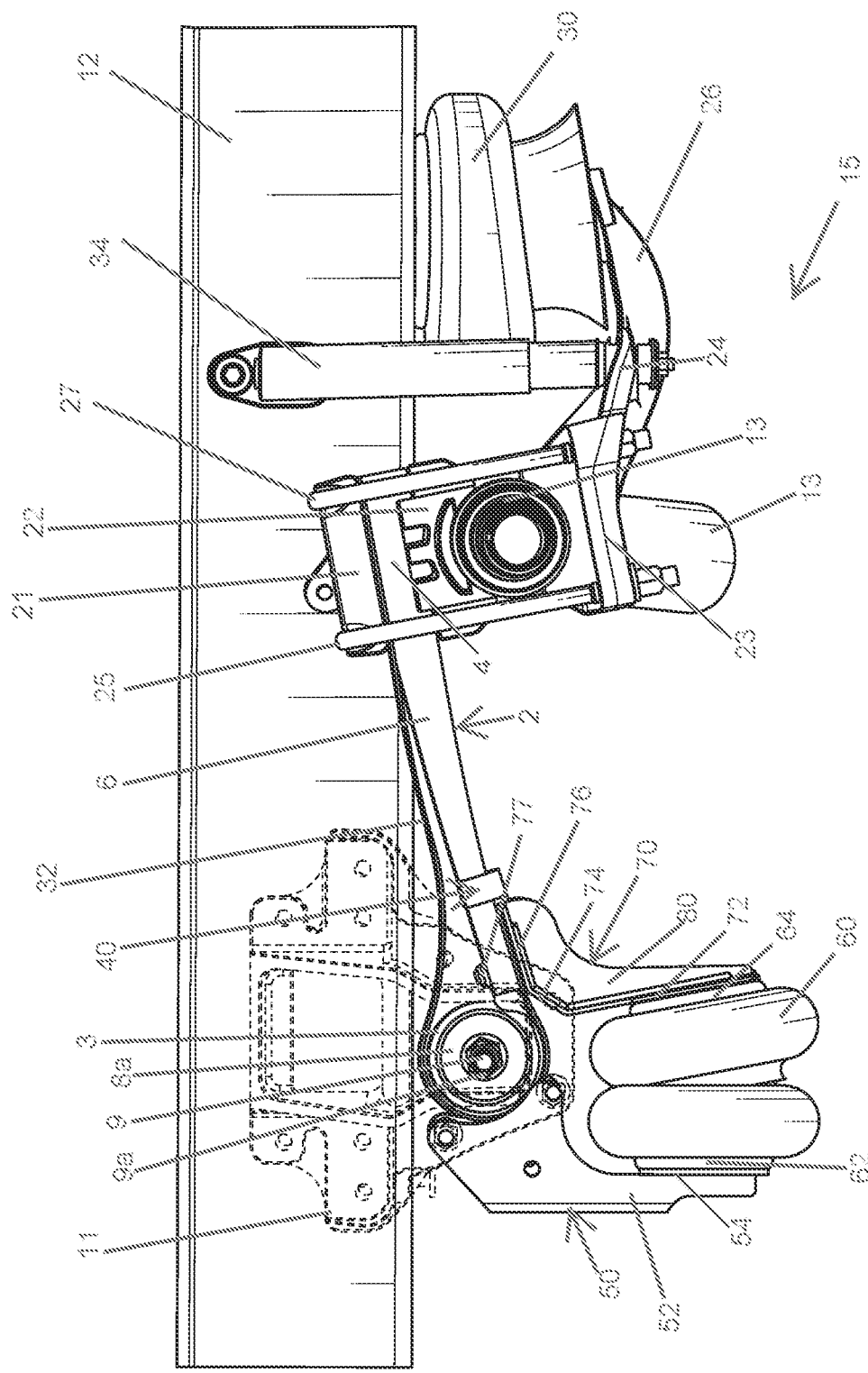
FIG. 3 is a left side, elevational view of the subject matter of FIG. 2 with the axle in a lifted position.
Figure 6:
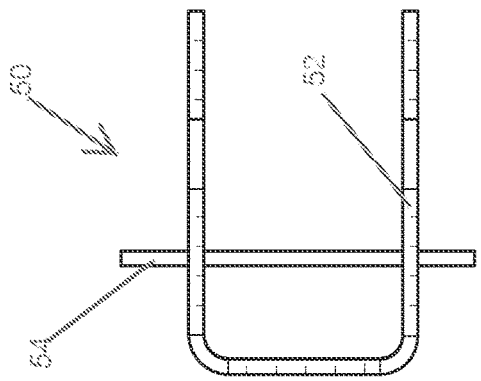
FIG. 6 is a top plan view of the bracket of FIG. 4.
Figure 7:
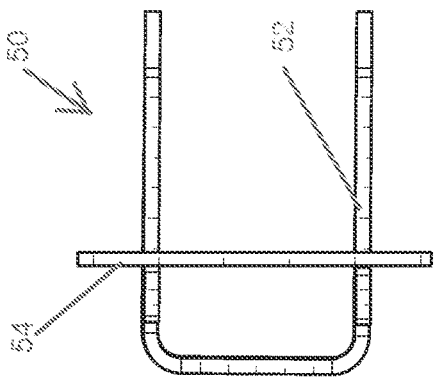
FIG. 7 is a bottom plan view of the bracket of FIG. 4.
Figure 5:
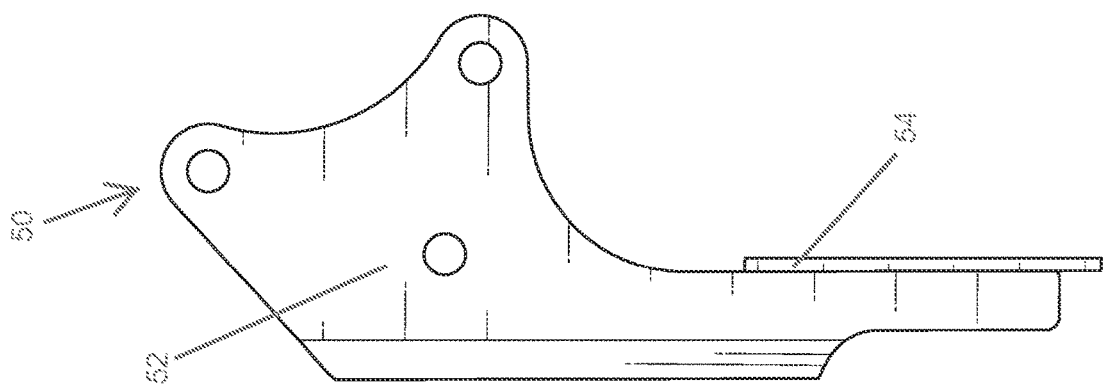
FIG. 5 is a left side, elevational view of the bracket of FIG. 4, the right side and left side elevational views of the bracket of FIG. 4 being mirror images of one another.
Figure 4:
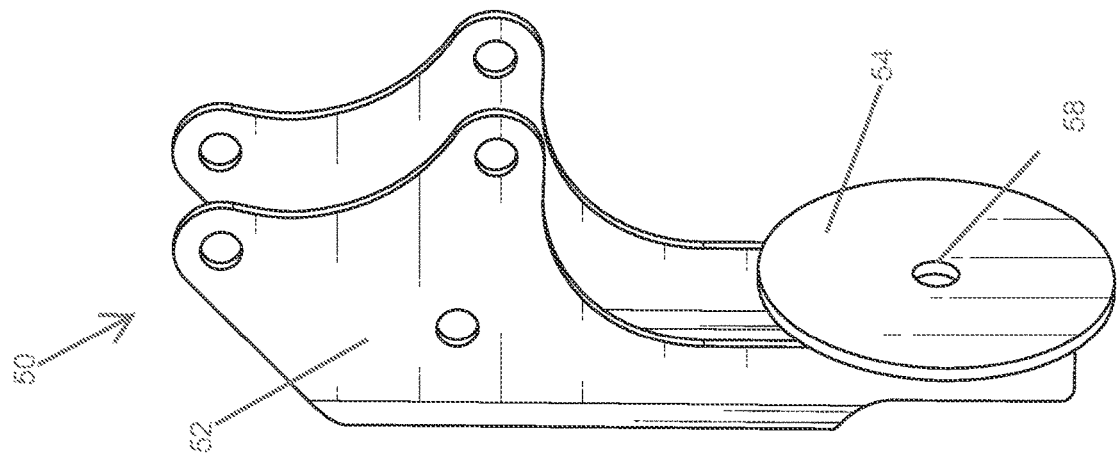
FIG. 4 is a left side, rear perspective view of a lift bracket from the lift axle suspension system of FIGS. 1-3.
Figure 8:
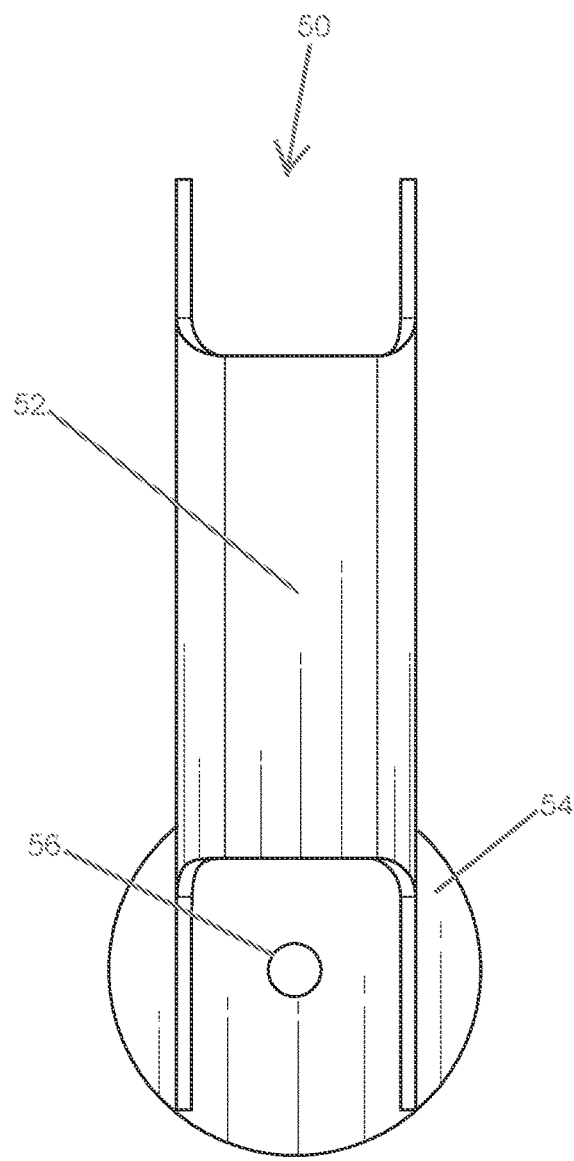
FIG. 8 is a front elevational view of the bracket of FIG. 4.
Figure 9:
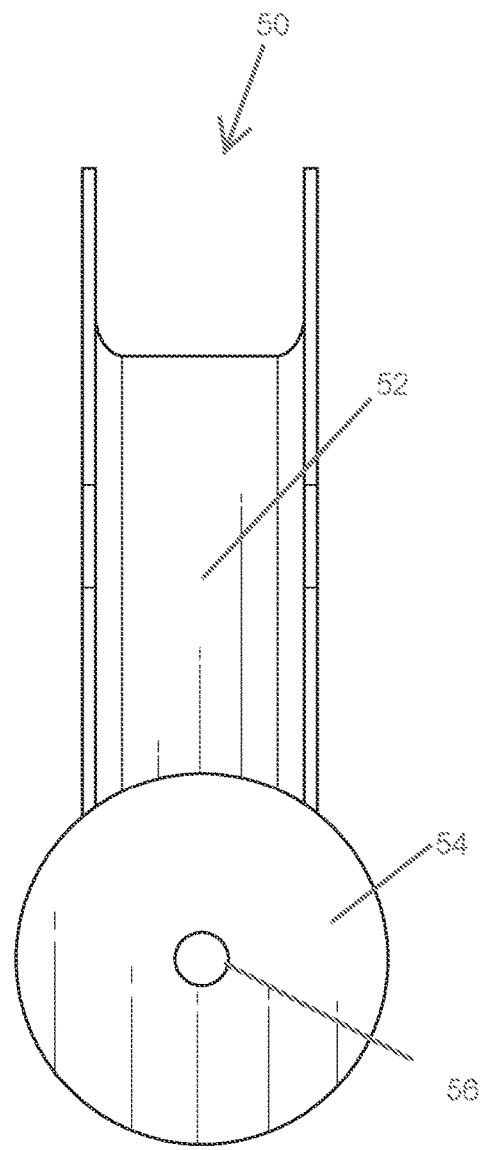
FIG. 9 is a rear elevational view of the bracket of FIG. 4.

FIG. 3 shows the subject matter of FIG. 2 in a lift position which would lift the wheels (not shown) of the axle out of contact with the ground surface. In lift mode, the lift spring is actuated, causing the lift spring to transmit a load to the lift paddle, which lifts the leaf spring and axle in a manner that causes the axle to no longer be in a position of engagement, through its wheels (not shown), with the ground surface. An air spring (if present) may release some or all of the downward pressure that it exerts when the axle is in a position of engagement with the ground surface.

In the first example of the present disclosure, a paddle 70, shown separately in FIGS. 10-16, includes a first pad 72 that connects to a second pad 76. The first pad 72 and the second pad 76 each present an engagement surface on the exterior of the lift paddle 70 for their attachment or fixed securement to, respectively, the movable end 64 of the lift spring 60 and the bottom surface of the leaf spring. In the example of FIGS. 1-3, the generally planar, exterior engagement surfaces of the first pad 72 and the second pad 76 are generally perpendicular or at slightly obtuse angle to one another. However, the size, spacing, orientation and geometry of the first pad 72 and the second pad 76 and their respective engagement surfaces may vary in accordance with the size, spacing, orientation and geometry of the suspension components to which they attach without departing from the scope of the present disclosure. Corresponding bores (76a, 6a) defined in the second pad, and in front arm 6 of the leaf spring 2 are positioned in registration and receive a suitable fastener 77.

Figure 12:
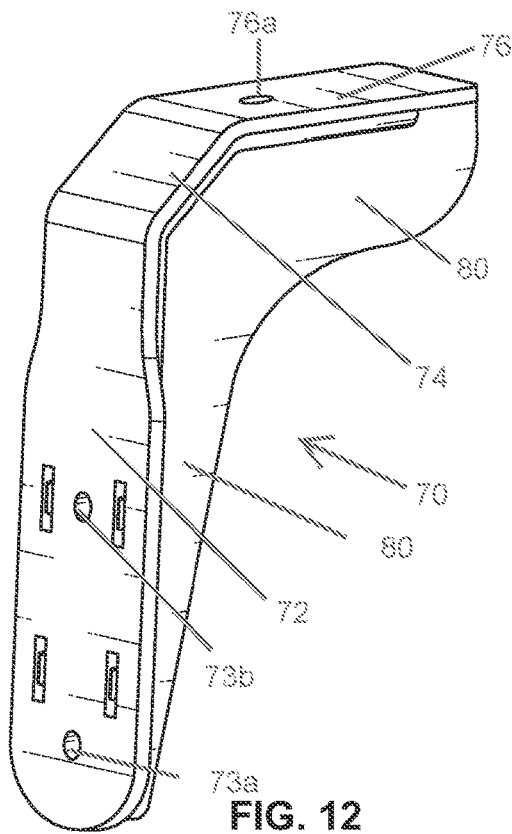
FIG. 12 is a front, right side, perspective view of the lift paddle of FIG. 12.
Figure 11:
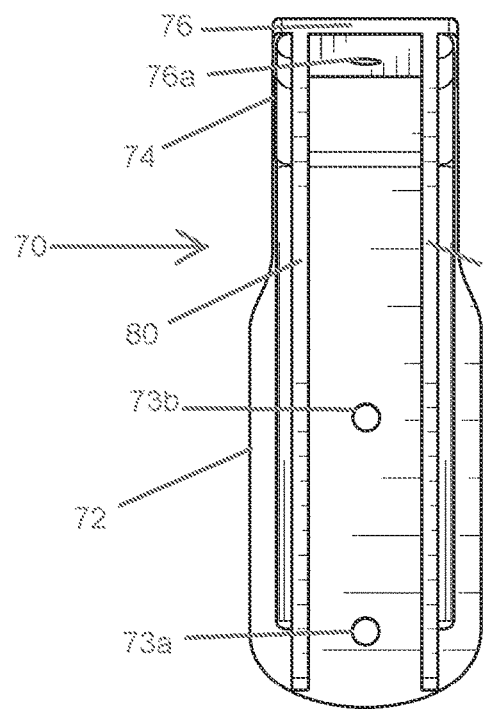
FIG. 11 is a rear, elevational view of the lift paddle of FIG. 10.
Figure 13:
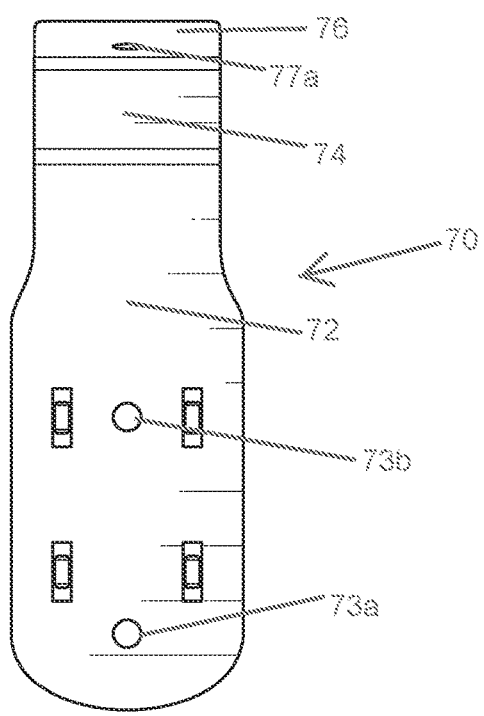
FIG. 13 is a front, elevational view of the lift paddle of FIG. 10.
Figure 14:
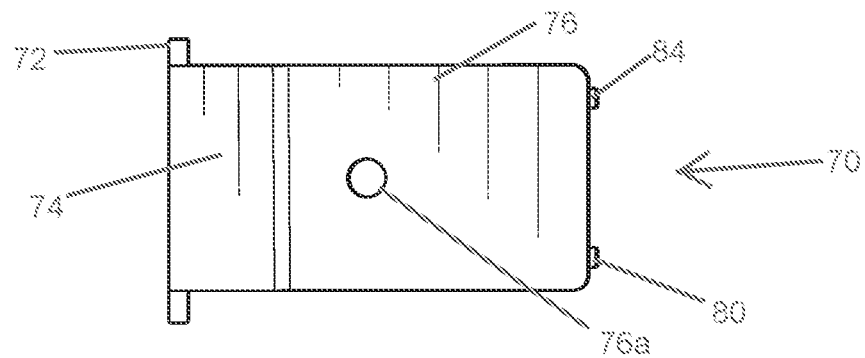
FIG. 14 is a top plan view of the lift paddle of FIG. 10.
Figure 15:
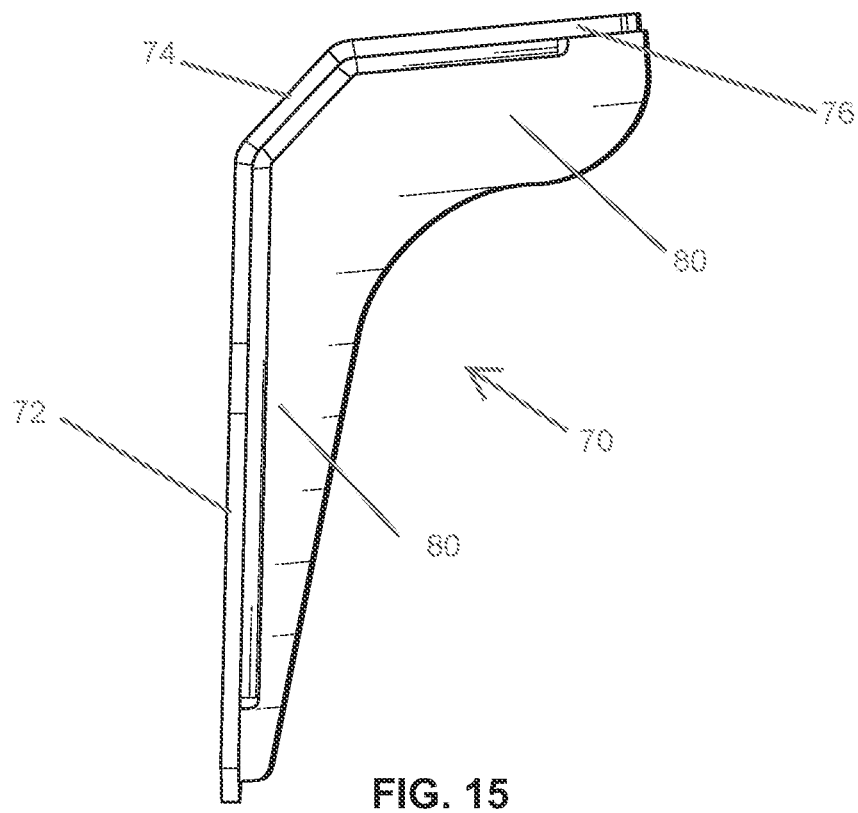
FIG. 15 is left side elevational view of the lift paddle of FIG. 10, the right side and left side elevational views of the subject matter of FIG. 10 being mirror images of one another.
Figure 16:
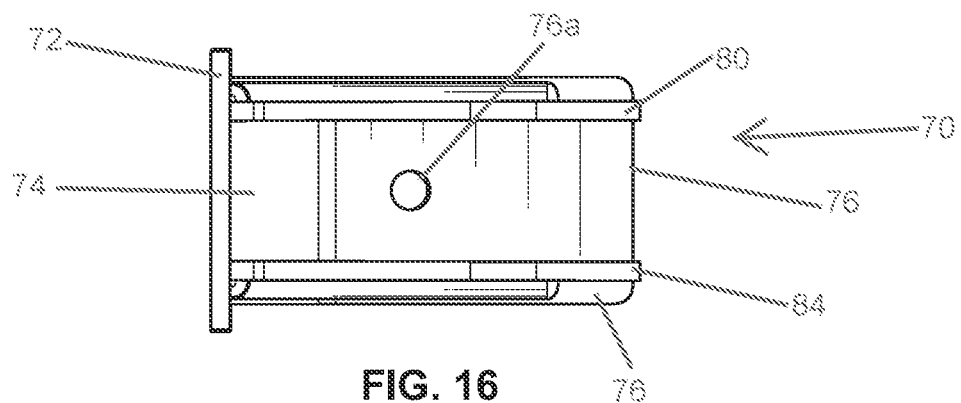
FIG. 16 is a bottom plan view of the lift paddle of FIG. 10.
Figure 17:
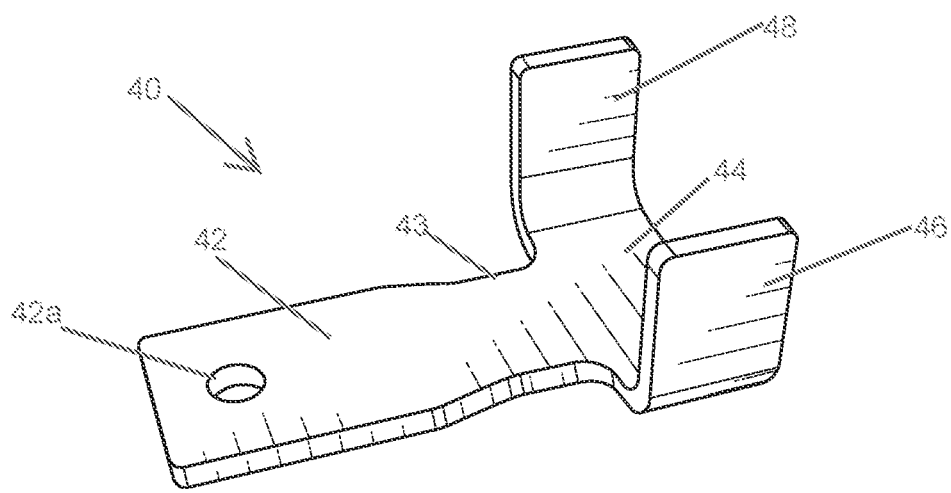
FIG. 17 is a left side, upper perspective view of a locator bracket of the embodiment shown in FIGS. 1-3.
Figure 18:
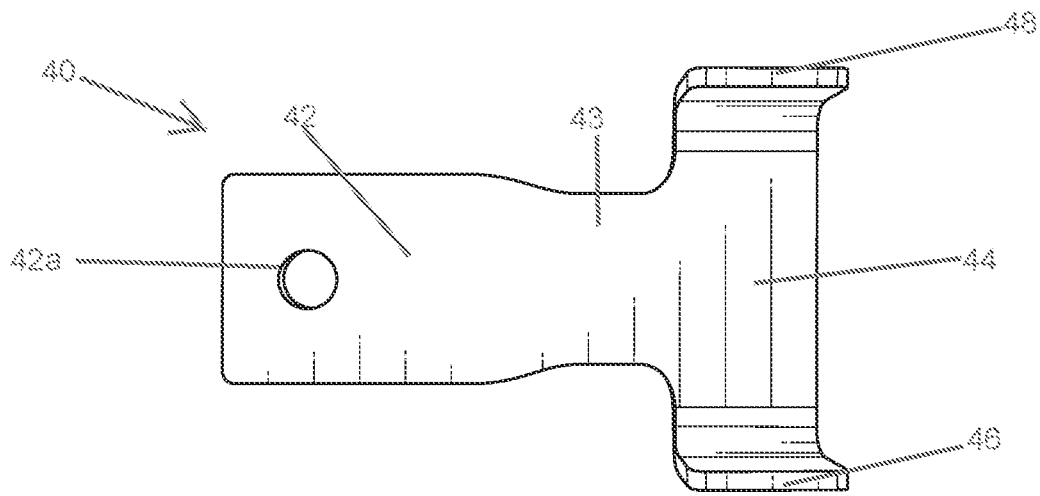
FIG. 18 is a top plan view of the locator bracket of FIG. 17.
Figure 19:
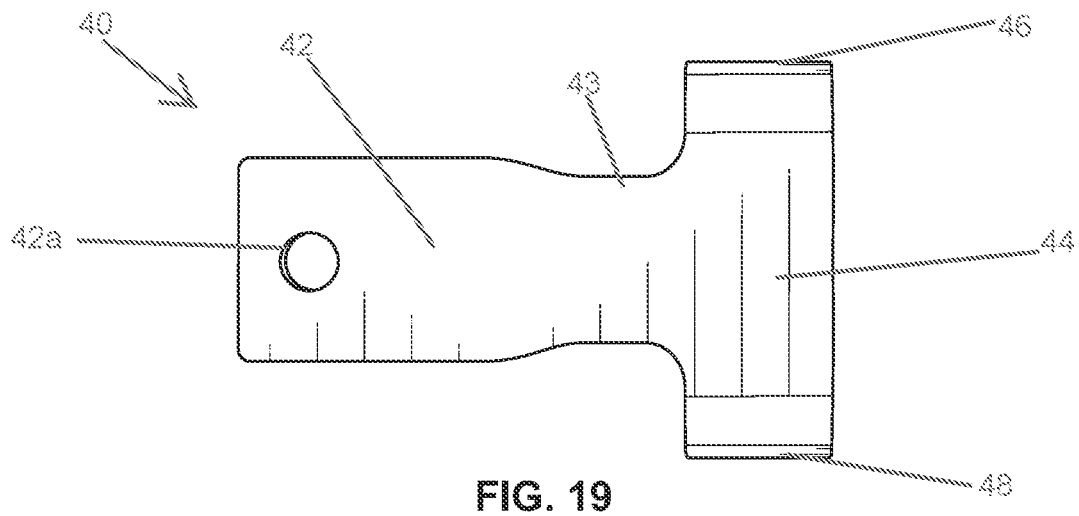
FIG. 19 is a bottom plan view of the locator bracket of FIG. 17.
Figure 20:
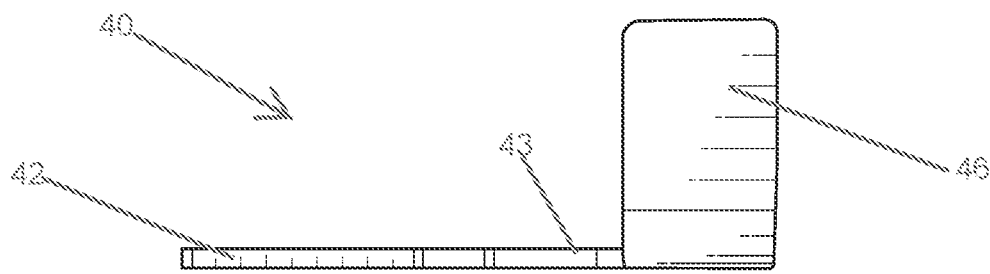
FIG. 20 is a left side elevational view of the locator bracket of FIG. 17, the right side and left side elevational views of the locator bracket of FIG. 17 being mirror images of one another.
Figure 21:
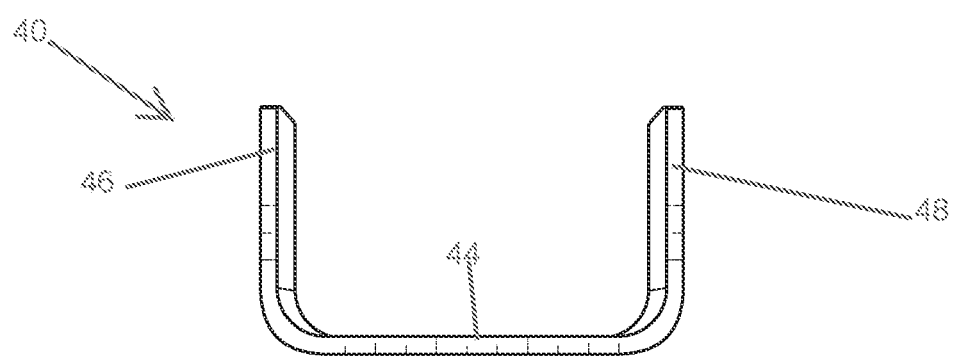
FIG. 21 is a rear elevational view of the locator bracket of FIG. 17.
Figure 22:
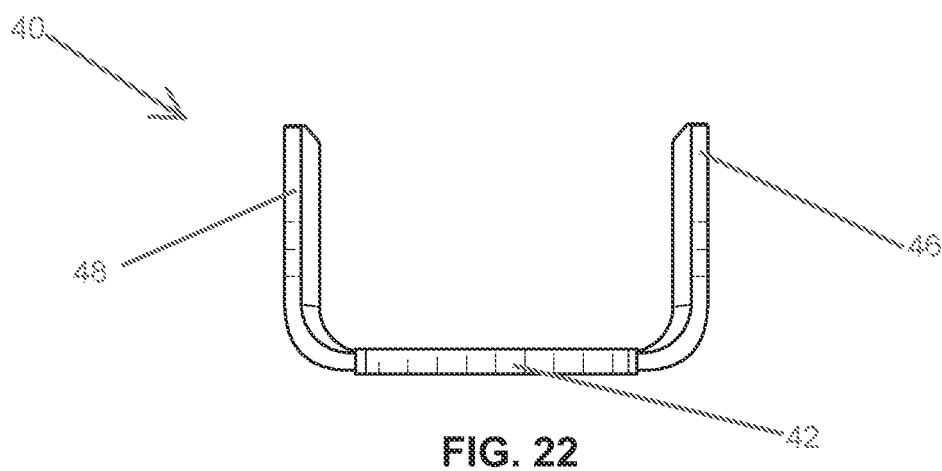
FIG. 22 is a front elevational view of the locator bracket of FIG. 17.
Figure 23:
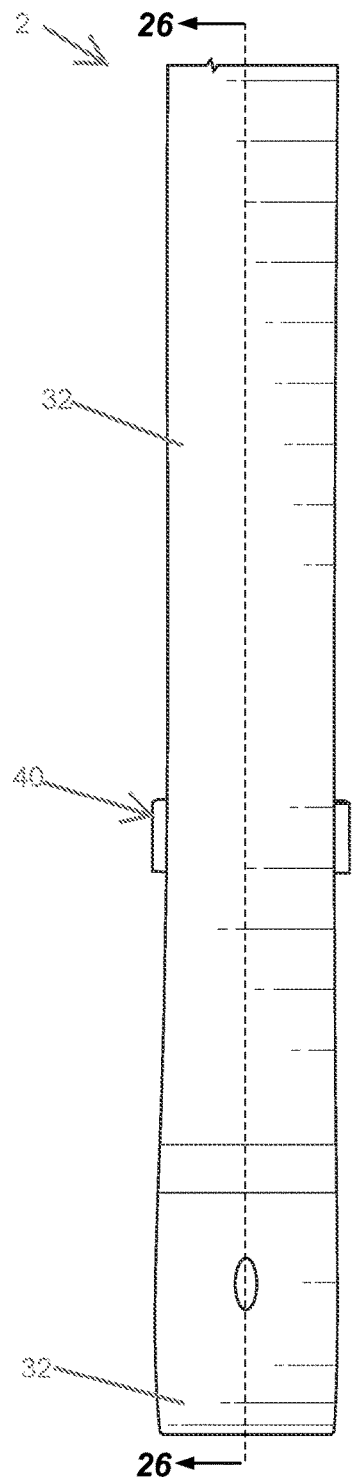
FIG. 23 is a partial, top plan view of the leaf spring with selected components of the embodiment of FIGS. 1-3.

The first pad 72 and the second pad 76 connect or join on the exterior of the lift paddle 70, directly, or indirectly via a generally planar, intermediate pad, wall or plate 74, that forms a bridge, such as, for example, as shown in FIG. 12. The first pad 72, the intermediate pad 74, and the second pad 76, together forms a continuous, exterior wall that extends from the first pad's attachment to the movable end 64 of the lift spring 60 to the second pad's fixed securement to the leaf spring 2. A vertical cross-section or side elevational view of this part of the first paddle, as shown in FIG. 15, may be defined or characterized by three segments, each having a different angle of orientation. As shown in FIG. 15, the generally vertical first segment associated with the first pad and the generally horizontal last segment associated with the second pad connect via the segment associated with the intermediate pad, which in the example shown in FIG. 15, has an orientation distinct from the first and third segments.

Figure 10:
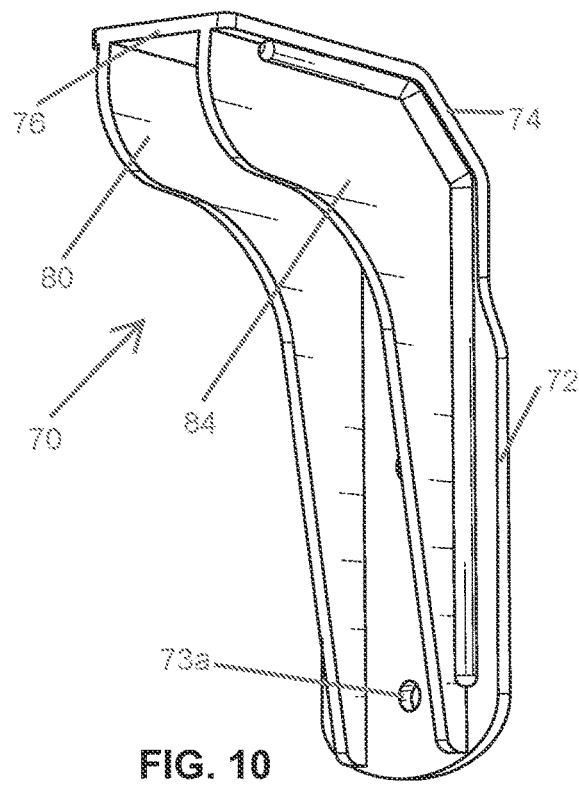
FIG. 10 is a right, rear perspective view of the lift paddle of FIGS. 1-3.

The lift paddle 70 of this first example also includes first and second rigid, support arms 80, 84. The first and second rigid, support arms 80, 84 are generally planar, generally parallel to one another and spaced apart in the lateral dimension of the lift paddle 70, being positioned respectively on the inboard and outboard sides of the lift paddle 70. In the first example, first and second rigid support arms have the same shape and size, however, in another aspect of the present disclosure, they may also vary without departing from the scope of the present disclosure. The front and top surfaces or edges of the first and second rigid, support arms 80, 84 are joined or are otherwise secured, by weldment as shown in FIGS. 10 and 15 or by other suitable fastening means to the first pad 72 and to the second pad 76 and to any intermediate pad 74 or bridge by which the first pad 72 and the second pad 76 connect or join. In the first example, the front and top surfaces or edges of the first and second rigid support arms continuously follow the interior geometry of the paddle 70 defined by the first pad 72, the intermediate pad 74 and the second pad 76 (see, e.g., FIGS. 10, 12 and 15) as the first and second rigid, support arms traverse the paddle 70 from the top downward. This construction helps to efficiently handle and distribute stress loads and to minimize stress concentrations.

From the top downward, the rear edges or rear surfaces of the first and second rigid, support arms 80, 84 descend from the rear edge of the bottom surface of the second pad, generally straight down. They then make an arcuate turn until the tangent of the rear edges or rear surfaces are generally horizontal which is approximately the elevation of the bottom edge of the intermediate pad 74. The rear edges or rear surfaces of the first and second rigid support arms 80, 84 then makes another turn in the opposite direction to continue their descent as they create a point or an area of inflection. At or slightly above the top of the bottom pad 72, the rear edges or rear surfaces of the first and second rigid, support arms 80, 84 orient in a generally straight line that forms in the lower half of the paddle 70 a wedge shape that converges with the interior surface of the first pad at the bottom of the paddle 70.

When the first and the second rigid, support arms 80, 84 are secured by weldment or other suitable fastening means to the first pad 72 having a first orientation, the second pad 76 have a second orientation, and to an intermediate pad 74 or bridge, having a third orientation that is between the first orientation and the second orientation, the example lift paddle 70 achieves the strength to react the dominant compressive and tensile loads required to lift and to maintain the axle 13 out of contact with the ground, while retaining the compliance necessary to accommodate forces that attempt to twist the lift paddle 70 which have the potential of damaging the lift spring 60 or other attached componentry if not properly managed. Such forces might be experienced by the leaf spring when it twists or rotates, such as for example, during roll motion or cross axle articulation. During these events, one side of an axle moves upward while the other side of the axle moves downwards, resulting in twisting or rotation of the leaf spring about its longitudinal axis. Such forces may be greater in a trailing leaf spring suspension than in a trailing stiff beam suspension.

Figure 24:
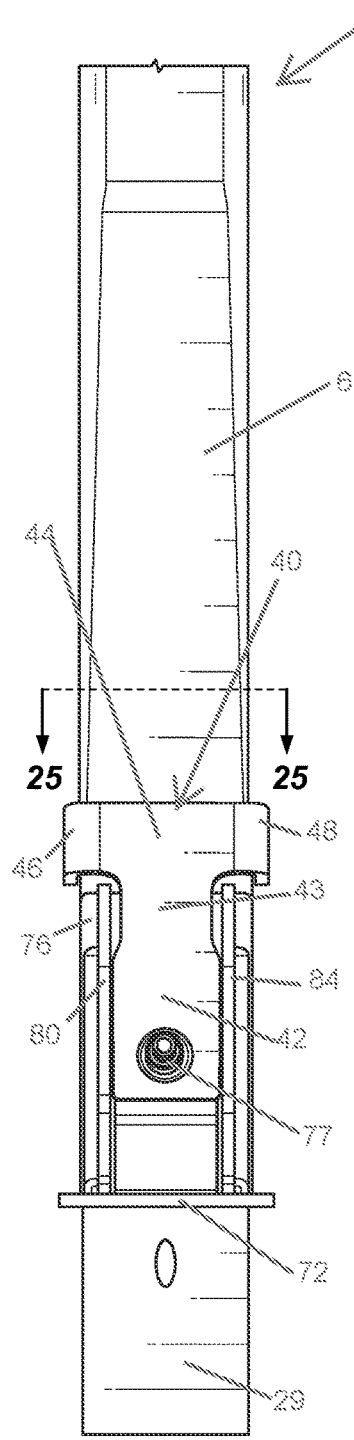
FIG. 24 is a partial bottom plan view of the subject matter of FIG. 23.
Figure 25:
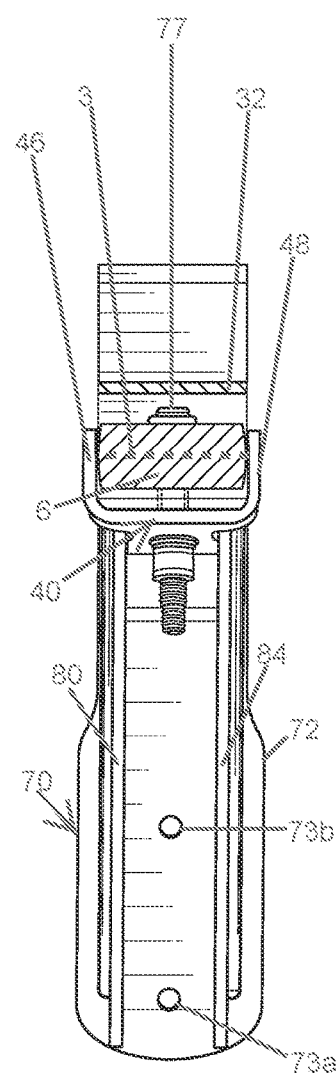
FIG. 25 is a cross-sectional, rear elevation view of the subject matter of FIG. 24, taken along lines 25-25 thereof.
Figure 26:
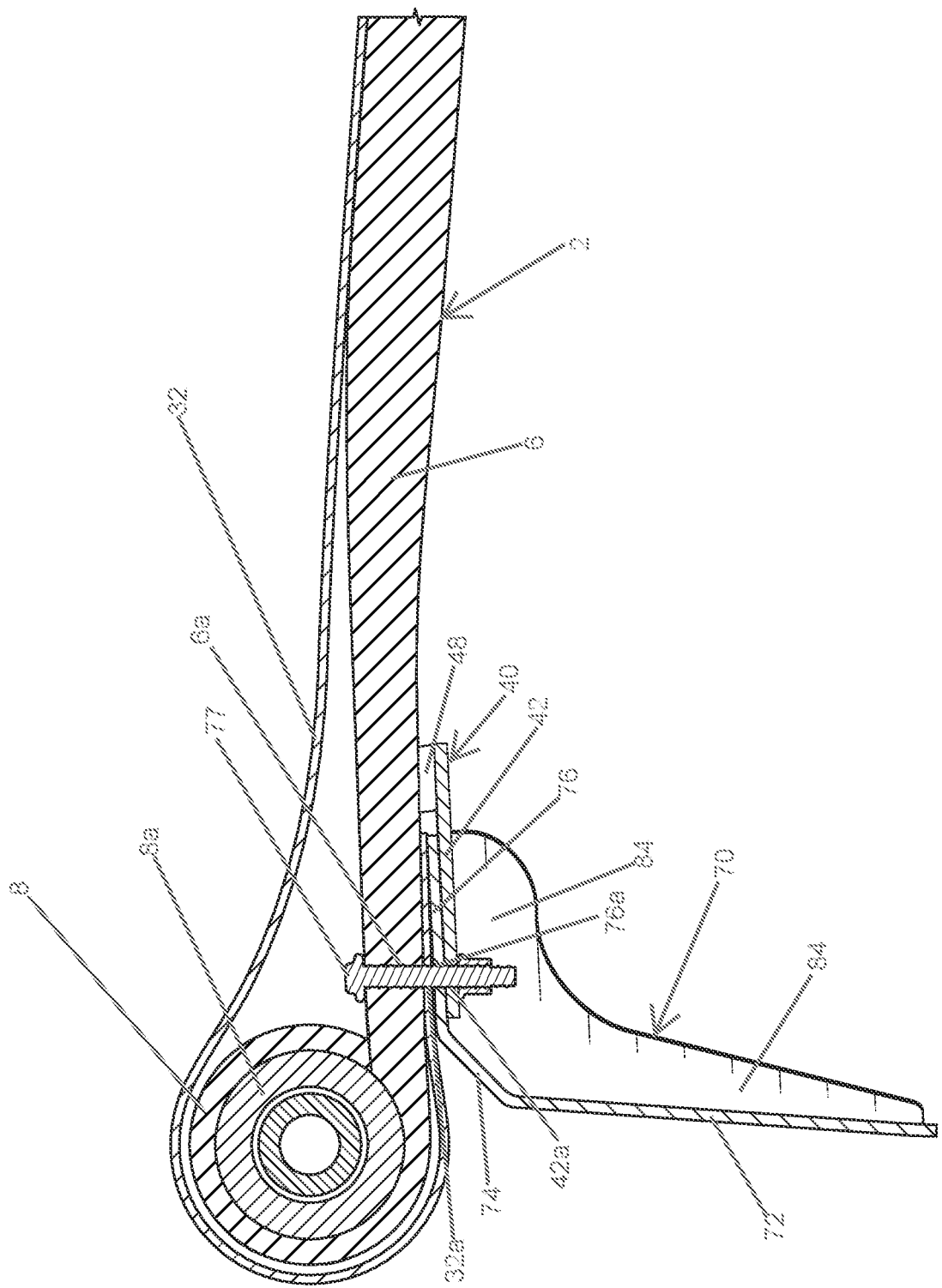
FIG. 26 is a cross-sectional side view through the left side of the subject matter of FIG. 23, taken through line 23-23 thereof.
Figure 33:
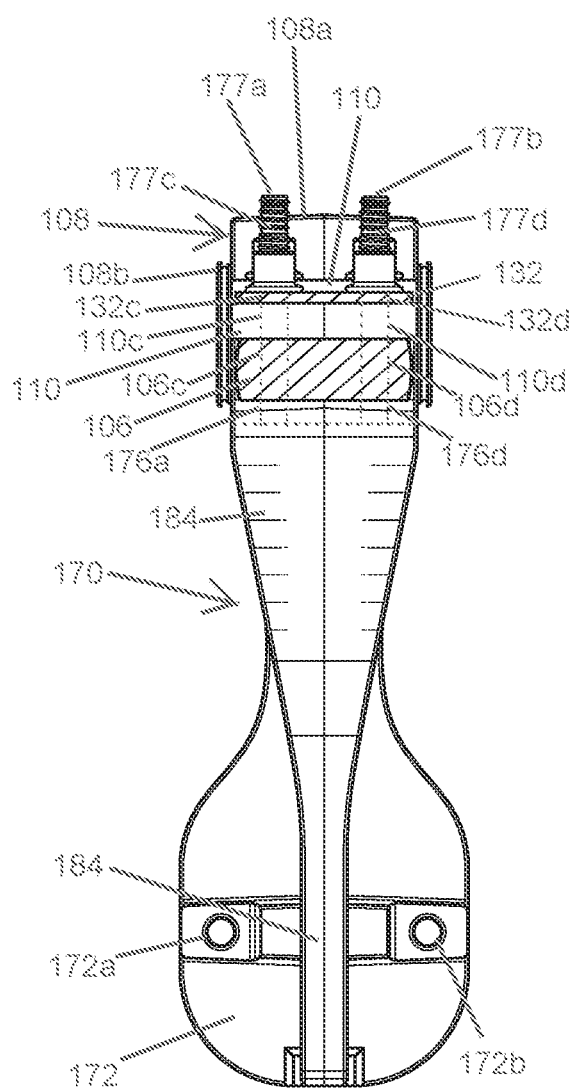
FIG. 33 is a rear elevational view of the subject matter of FIG. 29.
Figure 34:
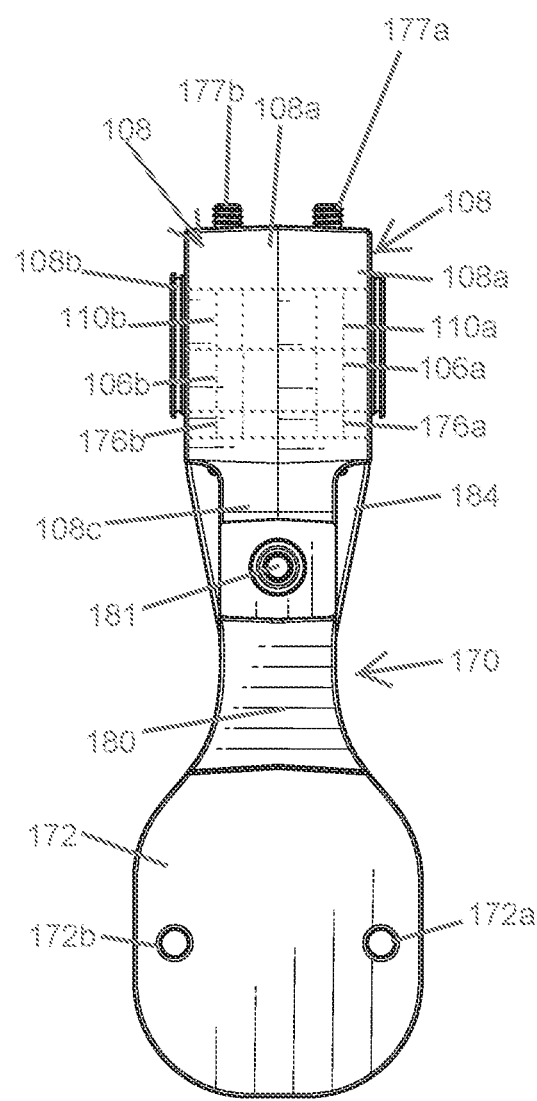
FIG. 34 is a front elevational view of the subject matter of FIG. 29.

A locator bracket 40, shown separately in FIGS. 17-22, is fixedly and reversibly secured, with the use of a threaded fastener 77, to the first example lift paddle 70, to facilitate the longitudinal alignment of the leaf spring and the first bracket during installation and to maintain this alignment during vehicle operation. The locator bracket 40 includes a generally horizontal base 42 and a generally vertical arm portion. The base 42 generally resembles a T shape and includes a first portion that includes an elongated stem or backbone. The first portion of the base 42 is received in a slot formed by the parallel, spaced apart, first and second rigid support arms 80, 84 on the underside of the top pad 76. The lateral edges of the first portion of the base 42 extend in parallel and then taper 43 before they flare laterally to form a shoulder portion 44 of the base 42 that includes first and second lateral end portions, which then extend vertically while spaced apart to form, respectively, a first arm 46 and a second arm 48, each of which may abut a lateral surface at the neutral axis 3 of the leaf spring 2 received between the first arm 46 and the second arm 48 (FIGS. 24, 25). Respective bores (6a, 76a, 42a) defined in each of the forward end portion of the front arm 6 of the leaf spring 2 (rearward of the eye 8), the top pad 76 of the lift paddle 7, and the base 42 of the locator bracket 40 are brought into registration by relative positioning of these structures to receive a fastener 77 and form a leaf spring, lift paddle 170 assembly of the present disclosure (FIG. 26). The front end of the leaf spring retainer 32 also is secured by fastener 77 in leaf spring retainer bore 32a (FIG. 33).

It should be noted that while the lift paddle 70 of the first example is illustrated with the use of a leaf spring 2 that includes an eye 8, it also would be operable with a leaf spring wherein the front arm is connected to an eye extension.

A second example of the present disclosure is shown in FIGS. 27-34 and includes many of the same components previously described in the first embodiment. Accordingly, the same reference numerals and descriptions above with respect to the first example apply as to those same components.

Figure 27:
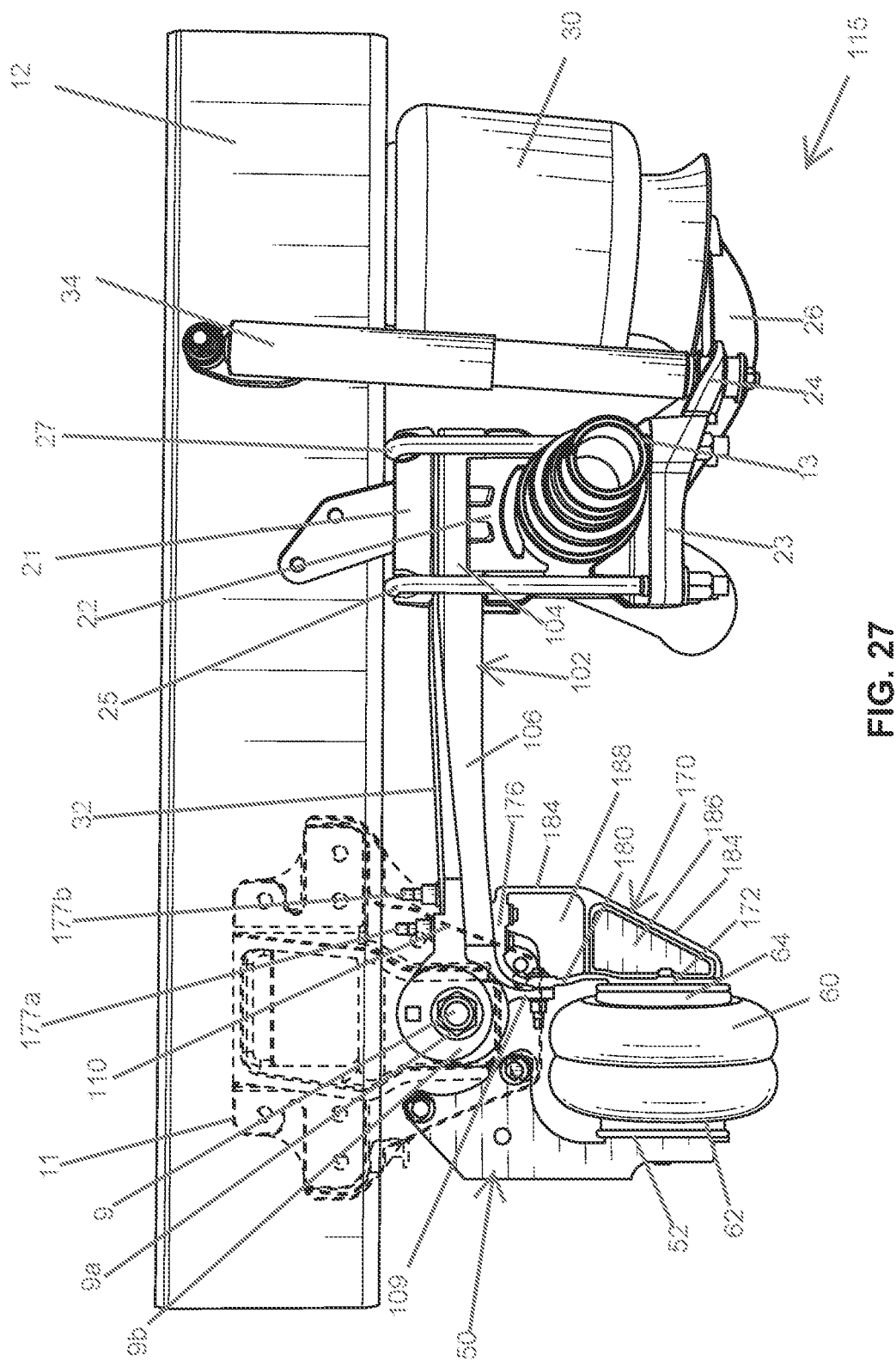
FIG. 27 is a left side, elevational view of a lift axle suspension system mounted to the chassis of a vehicle, incorporating a leaf spring and lift paddle, and with select components in phantom, according to a second embodiment of the present disclosure.

A lift axle suspension system incorporating the second example lift paddle 170 is indicated in general at 115 (FIG. 27). This second example lift paddle 170 is suitable for use with a leaf spring manufactured without an eye or other distal end configuration intended to facilitate pivotal connection of the leaf spring with a vehicle frame 12 or vehicle frame hanger 11. The leaf spring 102 of this second example includes a front arm 106 and a seat 104 and is connected or secured at the front end of the front arm 106 to an eye extension 108.

The lift paddle 170 of this second example includes a first pad 172 and a second pad 176, which are spaced apart and integrally formed in, or secured to, in fixed relation to one another in a frame, which also includes a first arm or front arm 180, a second arm or rear arm 184, and a third arm or interior arm 183. The first pad 172 is positioned to present a front or an exterior or an engagement surface for attachment to a second end or movable end 64 of a lift spring 60. The first pad 172 is generally vertically oriented and positioned in a lower and forward portion of the lift paddle 170, and is integrally formed with or fixedly secured with the use of other fasteners to a first arm 180 configured as an elongated rail or frame member traversing the first pad 172 on its rear surface. The second pad 176 is positioned in an upper portion of the lift paddle 170 and presents an upwardly facing engagement surface for engaging a bottom surface of the leaf spring 102.

The first arm or front arm 180 of the frame has a lower or first end portion integrally formed with or fixedly secured with the use of other fasteners to the first pad 172, from which the first arm 180 extends in a generally vertical direction. As the first arm 180 reaches the top of the lift paddle 170, it forms an arc in the upper front section of the lift paddle 170 after which an upper or second end portion of the first arm 180 is integrally formed with or secured with the use of other fasteners to the forward end portion or the rear surface of the top pad or second pad 176 of lift paddle 170.

A second arm or rear arm 184 of the frame has a lower or first end portion integrally formed with or secured with the use of other fasteners to the bottom rear portion of the first pad 172, from which the second arm 184 extends diagonally, in a vertical and horizontal direction away from the first pad 172. At or slightly above the top edge of the engagement surface of the first pad 172, the second arm 184 changes its orientation to ascend primarily in a vertical direction that is generally perpendicular to the leaf spring 102, increasing in size in the lateral dimension of the lift paddle 170, until it reaches the top of the lift paddle 170 where it then turns in the forward direction to present a top or second end portion that is integrally formed with or secured with the use of other fasteners to the rear end portion or the rear surface of the top pad or second pad 176 of lift paddle 170. The increase in size of the second arm 184 in the lateral dimension of the lift paddle 170 assist the load capacity of the lift paddle 170 and, when fixedly secured to an eye extension 108 as described and illustrated herein, assists the lift paddle 170 spring combination in resisting in forces that attempt to twist or rotate the leaf spring about its longitudinal axis.

A third arm or interior arm 183 of the frame extends across the interior of the frame of the second example lift paddle 170. A first end or forward end of the third arm is integrally formed with or secured with the use of other fasteners to the first arm or the front arm 180 at or slightly above the first pad 172. A second end or rear end of the third arm is integrally formed with or secured with the use of other fasteners to the second arm or the rear arm 184. When configured in this manner, the third arm or the interior arm 183 helps to define an upper section and a lower section of the lift paddle 170: the upper section having four sides that define a longitudinally and vertically disposed window 188, and the lower section generally defining a longitudinally and vertically disposed triangle or wedge 186 that is largest in the mid-section of the paddle 170 and converges with rear surface of the first pad 170 at the base of the first pad 172. A wall fills the interior of the lower section for added strength. The absence of a wall in the upper section reduces the weight of the paddle 170. It will be appreciated that the upper section and he lower section of the lift paddle 170 may be varied in size and shape without departing from the present disclosure.

The eye extension 108 of the second embodiments includes an eye in the form of a cylinder or generally cylindrical portion 108a configured to receive a bushing assembly 108b. The exterior surface of the cylinder 108a includes a first mounting provision 109 extending generally downward and a second mounting provision 110 extending generally rearword, which together permit the eye extension 108 to be attached or secured to each of the lift paddle 170 and the front end portion of the front arm 106 of a leaf spring 102, and when secured together, allows this assembly to be pivotally mounted to a vehicle hangar bracket 11.

In this second example, the first mounting provision 109 and the second mounting provision 110 are extensions positioned and spaced apart on the exterior surface of the cylindrical portion 108a of the eye extension 108.

Figure 28:
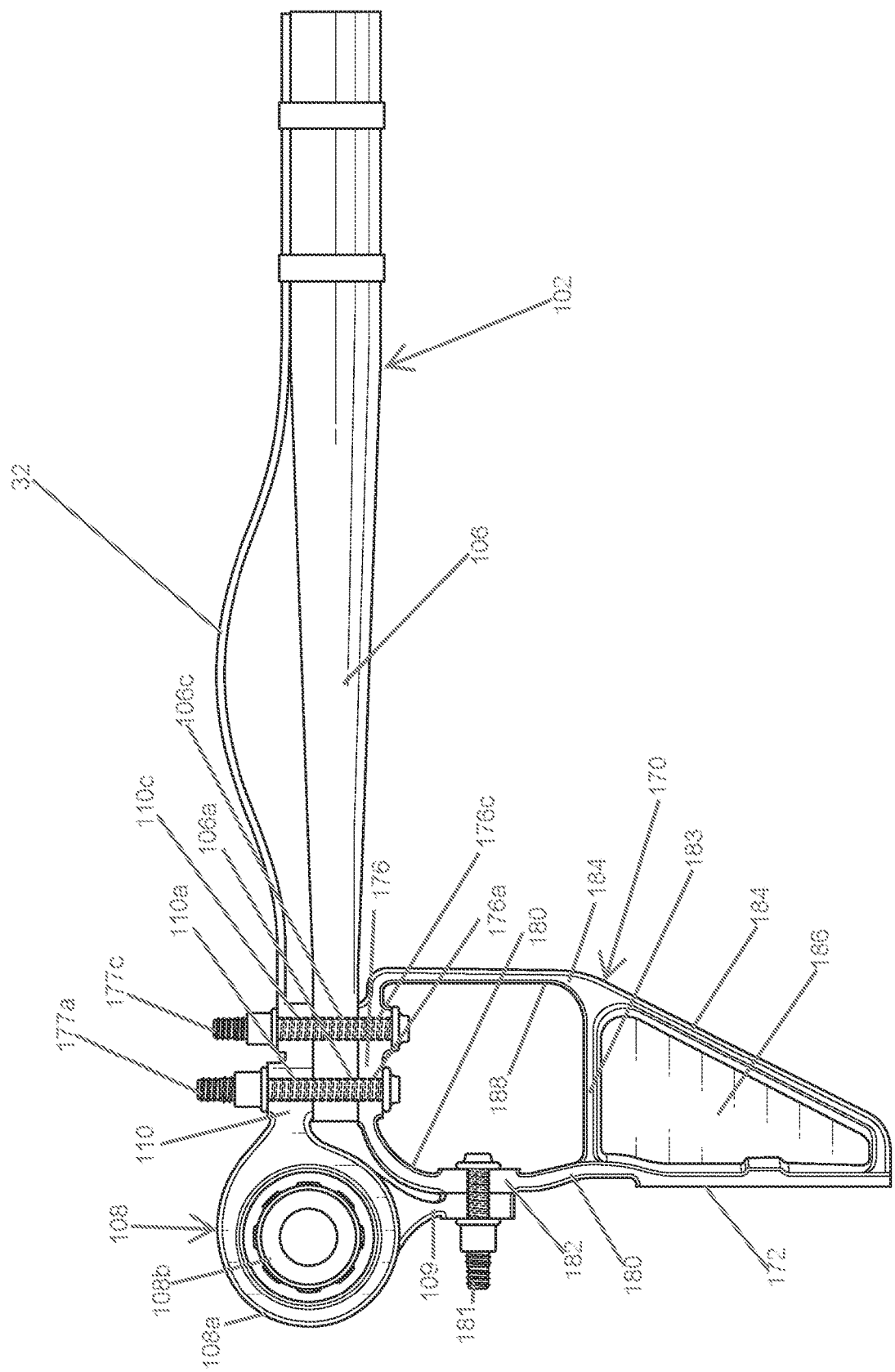
FIG. 28 is a left side, elevational view of the leaf spring, eye extension and lift paddle of FIG. 27.

The first mounting provision 109 of the eye extension 108 is located between the five and six o'clock position of the generally cylindrical portion 108a and is configured to abut a first mounting section 182 at the first arm 180 of the paddle 170 between the top of the first pad 172 and the top of the lift paddle 170. As shown in FIG. 28, respective bores defined in the first mounting provision 109 of the eye extension 108 and the first mounting section 182 of the first arm 180 of the paddle 170 are placed in registration by the relative positioning of the eye extension 108 and the lift paddle 170, to receive a fastener 181 to assist in fixedly securing the eye extension 108 and the lift paddle 170 together.

The second mounting provision of the eye extension 108 is located approximately eighty (80) to one hundred (100) degrees counterclockwise from the first mounting provision. degrees. The front end portion of the front arm 106 of the leaf spring 102 is positioned between the second mounting provision 110 of the eye extension 108 and the second pad 176 of the lift paddle 170 to place respective bores in each of these three structures in registration. Fasteners (177a, 177b, 177c, 177d) received in the respective bores (110a, 110b, 110d; 106a, 106b, 106c, 106d; 176a, 176b, 176c, 176d) are tightened to assist in securing these three structures in fixed securement relative to one another. The front end of the leaf spring retainer 132 also is secured by fasteners (177c, 177d) in leaf spring retainer bores 132c, 132d (FIG. 33).

Figure 35:
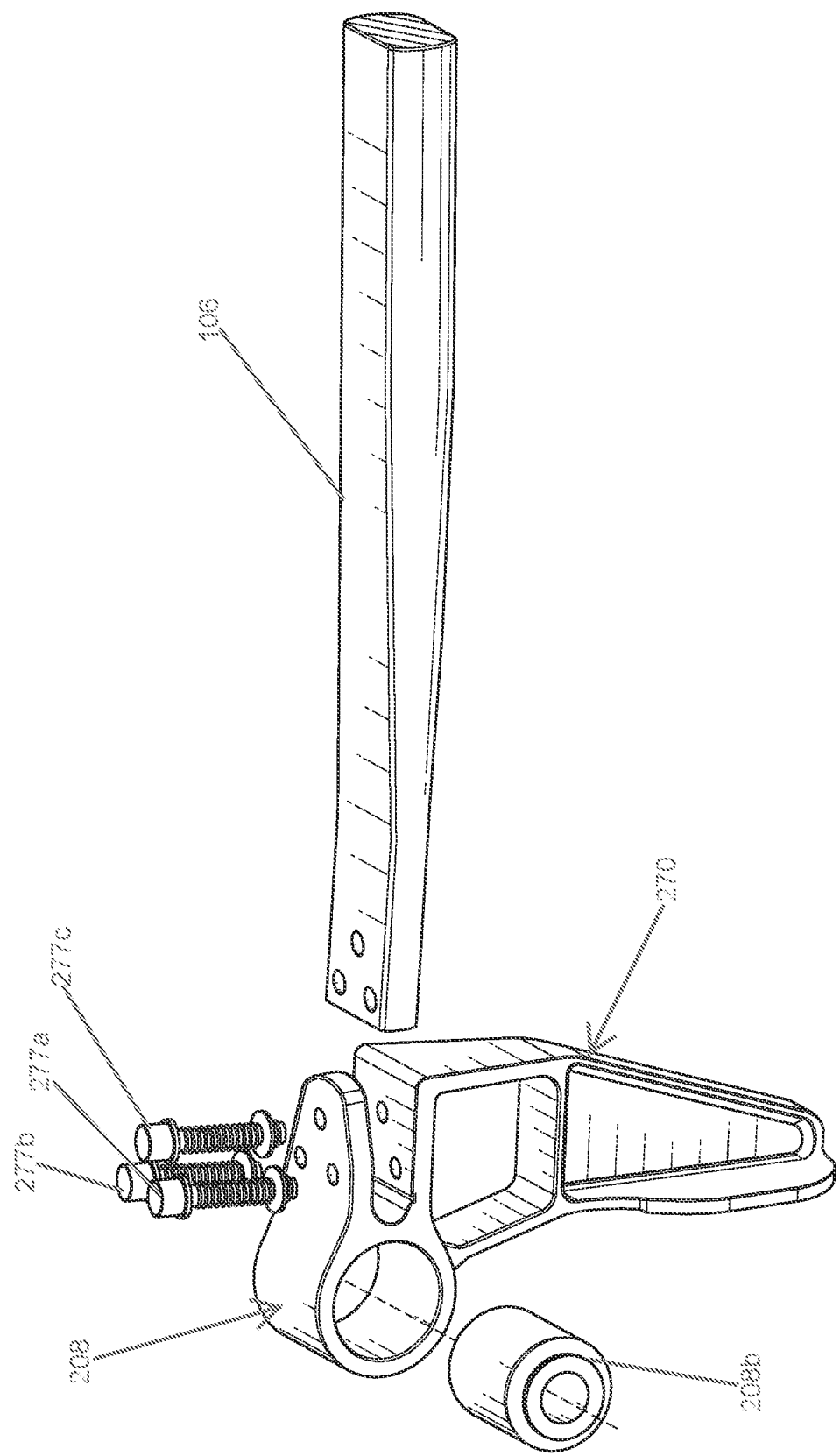
FIG. 35 is a left side, upper perspective exploded view of a lift paddle with eye extension, a bushing, the front arm of a leaf spring and fasteners, according to a third embodiment of the present disclosure.

A third embodiment of the present disclosure is shown in FIG. 38, and includes many of the same components previously described in the first embodiment. Accordingly, the same reference numerals and descriptions above with respect to the first example apply as to those same components. In a third embodiment of the present disclosure (FIG. 35), the example lift paddle 270 and eye extension 208 including a bushing assembly 208b are integrally formed in one piece construction.

Each of the structures of the foregoing examples may constructed from various materials including steel, ductile iron, aluminum, alloys or other suitable substantially rigid materials. It will also be appreciated that the pieces may be manufactured by any suitable method, such as by casting, forging, machining or the like. The same material and/or method of manufacturing need not be used for each piece. Manufacturing of knuckle componentry also may include machining, for example, to drill and/or tap bores or to flatten engagement surfaces, as further discussed herein.

It will be appreciated that throughout this disclosure, with respect to the descriptions of all of the examples provided, terms such as upper, lower, top, bottom, left, right, front and rear, all are relative terms and are not intended to be limiting because they depend on the context in which they are used and the relative position of the device at the time.

It will be understood that the embodiments described above are illustrative of some of the applications of the principles of the present subject matter. Numerous modifications may be made by those skilled in the art without departing from the spirit and scope of the claimed subject matter, including combinations of features that are individually disclosed or claimed herein. For these reasons, the scope of this disclosure is not limited to the above description but is as set forth in the following claims, and it is understood that claims may be directed to the features hereof, including as combinations of features that are individually disclosed or claimed herein.

We claim:

1. A lift axle suspension system comprising,
hanger bracket configured for attachment to a vehicle frame;
an axle;
a leaf spring, comprising a front arm and a seat, the front arm extending forwardly from the seat, the front arm having a top surface and a bottom surface and being of a generally solid construction, the leaf spring configured for coupling at the location of the seat to the axle with the use of an axle coupling fastener, the front arm of the leaf spring including an eye or connected to an eye extension, the leaf spring configured for pivotally mounting to the hangar bracket;
a lift bracket and a lift spring, the first end portion of the lift bracket secured to the hangar bracket, the second end portion the lift bracket connected to the first end portion of the lift spring;
a lift paddle comprising a first pad, a second pad, and a first rigid support arm, the first pad providing an engagement surface for attaching the first pad to the second end portion of the lift spring, the second pad providing an engagement surface for securing the second pad to the bottom surface of the front arm of the leaf spring, and the first rigid support arm connecting the first pad and the second pad to support the fixed position of the first pad and the second pad in relation to one another;
the front arm of the leaf spring defining a bore, the second pad of the lift paddle defining a bore, the bore of the front arm of the leaf spring extending through the leaf spring and positioned in registration with the bore of the second pad, the bores of the front arm of the leaf spring and the second pad receiving a fastener securing the front arm of the leaf spring to the second pad of the lift paddle;
wherein the lift bracket, the lift spring and the lift paddle are configured for arrangement in an operative relationship with one another wherein by actuation of the lift spring, a load is transmitted from the lift spring to the lift paddle and from the lift paddle to the leaf spring causing the axle to be lifted out of contact with the ground surface.

2. The lift axle suspension of claim 1 wherein the lift spring comprises an air spring.

3. The lift axle suspension of claim 1 wherein the lift spring is positioned below the leaf spring.

4. The lift axle suspension of claim 1, wherein the lift spring is configured to expand and contract along a central operational axis that is parallel to or that does not intersect, the front arm of the leaf spring.

5. The lift axle suspension of claim 1, wherein the paddle further comprising a second rigid, support arm connecting the first pad and the second pad to further support the fixed position of the first pad and the second pad in relation to one another.

6. The lift axle suspension of claim 5, wherein the first pad and at least one of the first rigid support arm and the second rigid support arm forms a wedge that converges at the bottom of the lift paddle.

7. The lift axle suspension of claim 5, wherein the first rigid support arm and the second rigid support arm are positioned spaced apart from one another on opposite sides of the lift paddle.

8. The lift axle suspension of claim 1 wherein the front arm of the leaf spring includes the eye which is integrally formed with the leaf spring in one piece construction.

9. The lift axle suspension of claim 5 wherein the first rigid support arm and the second rigid support arm are similar in shape and in size and are positioned, respectively, on the inboard side and the outboard side of the lift paddle to form respectively, an inboard face and an outboard face of the lift paddle.

10. The lift axle suspension of claim 5 where the first rigid support arm and the second rigid support arm are plates.

11. The lift axle suspension of claim 5 wherein the first pad and the second pad further connect to one another through an intermediate pad to form a continuous wall, and wherein the first pad, the intermediate pad, and the second pad each have a different orientation.

12. The lift axle suspension of claim 11 wherein the first pad, the intermediate pad, and the second pad are formed from the same piece of material having a first bend line and a second bend line, the first bend line being generally parallel to the second bend line, the first bend line representing a boundary line between the first pad and the intermediate pad, the second bend line representing a boundary line between the intermediate pad and the second pad.

13. The lift axle suspension of claim 1, the lift paddle including a locator bracket configured to aid lateral alignment of the front arm of the leaf spring and the lift paddle during installation and during vehicle operation,
the locator bracket comprising a base and an arm portion, the base having a width and a length that provides a first longitudinal end portion and a second longitudinal end portion, the top surface of the base being generally planar, the arm portion having a first arm and a second arm positioned across from one another on opposite sides of the second longitudinal end portion and extending in a generally vertical direction in relation to the base portion,
wherein the base of the first longitudinal end portion of the locator bracket is secured in fixed relation to the second pad of the lift paddle at a location that positions the first arm and the second arm of the locator bracket to extend above the top surface of the second pad and to receive the front arm of the leaf spring between the first arm and the second arm of the locator bracket.

14. The lift axle suspension of claim 13 wherein the base of the locator bracket is positioned below and in contact with the bottom surface of the lift paddle, placing the first arm and the second arm of the locator bracket rearward of the second pad, and wherein front arm of the leaf spring, the second pad of the lift paddle and the locator bracket are secured fixed together with at least one fastener.

15. The lift axle suspension of claim 5 wherein the first rigid support arm and the second rigid support arm are dissimilar in shape and in size and are spaced apart in the longitudinal dimension of the lift paddle, the first rigid support arm positioned in the front of the lift paddle, the second rigid support arm positioned in the rear of the lift paddle.

16. The lift axle suspension of claim 5 wherein the lift paddle including a longitudinally and vertically disposed window at least partially defined by at least a portion of the first rigid support arm positioned in the front of the lift paddle and at least a portion of the second rigid support arm positioned in the rear of the lift paddle.

17. The lift axle suspension of claim 5 wherein the at least a portion of the second rigid support arm increases in size in the lateral dimension as the portion extends in the vertical direction.

18. The lift axle suspension of claim 5, the front arm of the leaf spring connected to the eye extension, the eye extension including a cylindrical portion and a first mounting provision and a second mounting provision spaced apart and positioned on an exterior surface of the cylindrical portion,
the first rigid support arm of the lift paddle including a mounting section positioned in the front of the lift paddle, the first mounting provision of the eye extension fixedly secured to the mounting section,
the front arm of the leaf spring having a front end portion positioned between the second mounting provision of the eye extension and the top surface of the second pad of the lift paddle,
the second mounting provision of the eye extension, the front end portion of the front arm of the leaf spring, and the second pad of the lift paddle fixedly and reversibly secured together with the fastener.

19. The lift axle suspension of claim 18 wherein the first mounting provision of the eye extension is integrally formed in one piece construction with the mounting section of the first rigid support arm of the lift paddle.

20. The lift axle suspension system of claim 1 wherein the fastener securing the second pad of the lift paddle to the leaf spring is the sole fastener securing the lift paddle to the leaf spring.

21. A leaf spring and lift paddle combination for a lift axle suspension, the leaf spring and lift paddle combination comprising
a leaf spring comprising a front arm and a seat, the front arm extending forwardly from the seat, the front arm having a top surface and a bottom surface and being of a generally solid construction, the leaf spring configured for coupling at the location of the seat to an axle, the front arm of the leaf spring including an eye or connected to an eye extension to permit the leaf spring and lift paddle combination to be pivotally mounted to a vehicle hangar bracket;
a lift paddle comprising a first pad, a second pad, and a first rigid support arm, the first pad of the lift paddle providing an engagement surface to attach the first pad to a movable end of a mounted lift spring, the second pad of the lift paddle providing an engagement surface for securing the second pad to the bottom surface of the front arm of the leaf spring, and the first rigid support arm connecting the first pad and the second pad to support the fixed position of the first pad and the second pad in relation to one another,
the front arm of the leaf spring defining a bore, the second pad of the lift paddle defining a bore, the bore of the front arm of the leaf spring extending through the leaf spring and positioned in registration with the bore of the second pad, the bores of the front arm of the leaf spring and the second pad receiving a fastener securing the front arm of the leaf spring to the second pad of the lift paddle.

* * * * *